(12) United States Patent  
Konishi et al.

(10) Patent No.: US 7,948,430 B2  
(45) Date of Patent: May 24, 2011

(54) POSITION ESTIMATING SYSTEM, POSITION ESTIMATING METHOD, POSITION ESTIMATING DEVICE AND ITS PROGRAM

(75) Inventors: Yusuke Konishi, Tokyo (JP); Toshiyasu Nakao, Tokyo (JP)

(73) Assignee: NEC Corporation, Tokyo (JP)

( * ) Notice: Subject to any disclaimer, the term of this patent is extended or adjusted under 35 U.S.C. 154(b) by 309 days.

(21) Appl. No.: 12/094,524

(22) PCT Filed: Nov. 17, 2006

(86) PCT No.: PCT/JP2006/322976  
§ 371 (c)(1),  
(2), (4) Date: May 21, 2008

(87) PCT Pub. No.: WO2007/058302  
PCT Pub. Date: May 24, 2007

(65) Prior Publication Data  
US 2009/0267823 A1 Oct. 29, 2009

(30) Foreign Application Priority Data

Nov. 21, 2005 (JP) ................................ 2005-335471  
Nov. 15, 2006 (JP) ................................ 2006-308554

(51) Int. Cl.  
*G01S 13/00* (2006.01)  
*G01S 13/08* (2006.01)
(52) U.S. Cl. ............. 342/27; 342/28; 342/118; 342/146
(58) Field of Classification Search .................. 342/27, 342/28, 118, 146, 147, 156  
See application file for complete search history.

(56) References Cited

U.S. PATENT DOCUMENTS

| | | | | |
|---|---|---|---|---|
| 3,680,100 A | * | 7/1972 | Woerrlein | 342/13 |
| 3,890,615 A | * | 6/1975 | Moran | 342/28 |
| 3,967,283 A | * | 6/1976 | Clark et al. | 342/28 |
| 4,079,361 A | * | 3/1978 | Woode | 342/27 |
| 4,124,848 A | * | 11/1978 | Clark et al. | 340/524 |
| 4,197,537 A | * | 4/1980 | Follen et al. | 342/27 |
| 4,382,291 A | * | 5/1983 | Nakauchi | 367/93 |
| 4,595,924 A | * | 6/1986 | Gehman | 342/28 |

(Continued)

FOREIGN PATENT DOCUMENTS

JP 4-115176 4/1992

(Continued)

OTHER PUBLICATIONS

IJapanese Official Action dated Mar. 9, 2011, together with a partial English-language translation.

*Primary Examiner* — Thomas H Tarcza  
*Assistant Examiner* — Peter Bythrow  
(74) *Attorney, Agent, or Firm* — Scully, Scott, Murphy & Presser, P.C.

(57) ABSTRACT

A position estimating device (4) which estimates the position of an object by comparing a receiving pattern obtained from ID transmitters (2a, 2b, . . . ) and ID receivers (3a, 3b, . . . ) installed in an environment with a prestored receiving pattern. Position of an object equipped with no extra device can be estimated only with the ID transmitters and ID receivers installed in an environment even in an indoor multipath environment by utilizing a fact that a receiving pattern obtained from ID transmitters (2a, 2b, . . . ) and ID receivers (3a, 3b, . . . ) installed in an environment changes depending on the position of the object.

24 Claims, 25 Drawing Sheets

U.S. PATENT DOCUMENTS

| | | | | |
|---|---|---|---|---|
| 5,019,822 | A * | 5/1991 | Kirkland | 342/22 |
| 5,150,099 | A * | 9/1992 | Lienau | 340/552 |
| RE35,607 | E * | 9/1997 | Nagamune et al. | 702/158 |
| 5,959,571 | A * | 9/1999 | Aoyagi et al. | 342/70 |
| 6,166,682 | A * | 12/2000 | Kosugi et al. | 342/192 |
| 6,239,736 | B1 * | 5/2001 | McDonald et al. | 342/28 |
| 6,456,229 | B2 * | 9/2002 | Wurman et al. | 342/59 |
| 6,462,699 | B2 * | 10/2002 | Wurman et al. | 342/59 |
| 6,466,168 | B1 * | 10/2002 | McEwan | 342/465 |
| 6,518,916 | B1 * | 2/2003 | Ashihara et al. | 342/70 |
| 6,590,520 | B1 * | 7/2003 | Steele et al. | 342/26 R |
| 6,856,280 | B1 * | 2/2005 | Eder et al. | 342/147 |
| 7,075,315 | B2 * | 7/2006 | Tanaka | 324/642 |
| 7,298,314 | B2 * | 11/2007 | Schantz et al. | 342/125 |
| 7,349,683 | B2 * | 3/2008 | Misikangas et al. | 455/404.2 |
| 7,385,513 | B2 * | 6/2008 | Everest et al. | 340/573.1 |
| 7,428,468 | B2 * | 9/2008 | Takemura et al. | 702/159 |
| 7,589,665 | B2 * | 9/2009 | Heide et al. | 342/127 |
| 7,692,575 | B2 * | 4/2010 | Nishimura | 342/147 |
| 2002/0191554 | A1 * | 12/2002 | Kondo | 370/328 |
| 2003/0098697 | A1 * | 5/2003 | Tanaka | 324/637 |
| 2005/0136845 | A1 * | 6/2005 | Masuoka et al. | 455/67.14 |
| 2009/0267823 | A1 * | 10/2009 | Konishi et al. | 342/146 |
| 2009/0284350 | A1 * | 11/2009 | Konishi et al. | 340/10.1 |

FOREIGN PATENT DOCUMENTS

| | | |
|---|---|---|
| JP | 5-166074 | 7/1993 |
| JP | 2679360 | 8/1997 |
| JP | 9-236651 | 9/1997 |
| JP | 9-274077 | 10/1997 |
| JP | 2000-98050 | 4/2000 |
| JP | 2001-092885 | 4/2001 |
| JP | 2001-229474 | 8/2001 |
| JP | 2002-168937 | 6/2002 |
| JP | 3336300 | 8/2002 |
| JP | 2003-78947 | 3/2003 |
| JP | 2003-185735 | 7/2003 |
| JP | 2004-46904 | 2/2004 |
| JP | 2004-112482 | 4/2004 |
| JP | 2004-251816 | 9/2004 |
| JP | 2004-286567 | 10/2004 |
| JP | 2004-294403 | 10/2004 |
| JP | 2004-297334 | 10/2004 |
| JP | 2004-309423 | 11/2004 |
| JP | 2005-55186 | 3/2005 |
| JP | 2005-99018 | 4/2005 |
| JP | 2005-528621 | 9/2005 |
| JP | 2006-504963 | 2/2006 |
| WO | WO 03/071502 A1 | 8/2003 |
| WO | WO 2004/042419 A2 | 5/2004 |
| WO | WO 2004/079687 A1 | 9/2004 |

* cited by examiner

FIG. 3

[EXAMPLE OF RECEPTION PATTERN]

| SET OF ID RECEIVING DEVICE AND ID TRANSMITTING DEVICE | RECEPTION INTENSITY |
|---|---|
| (ID RECEIVING DEVICE 3a, ID TRANSMITTING DEVICE 2a) | 165 |
| (ID RECEIVING DEVICE 3a, ID TRANSMITTING DEVICE 2b) | 200 |
| ⋮ | ⋮ |
| (ID RECEIVING DEVICE 3b, ID TRANSMITTING DEVICE 2a) | 178 |
| (ID RECEIVING DEVICE 3b, ID TRANSMITTING DEVICE 2b) | 154 |
| ⋮ | ⋮ |

FIG. 4

| REFERENCE POSITION | RECEPTION PATTERN |
|---|---|
| (0, 1) | [RECEPTION PATTERN 01] |
| (0, 2) | [RECEPTION PATTERN 02] |
| ⋮ | ⋮ |
| (1, 1) | [RECEPTION PATTERN 11] |
| (1, 2) | [RECEPTION PATTERN 12] |
| ⋮ | ⋮ |

[EXAMPLE OF RECEPTION PATTERN]

| SET OF ID RECEIVING DEVICE AND ID TRANSMITTING DEVICE | RECEPTION INTENSITY |
|---|---|
| (ID RECEIVING DEVICE 3a, ID TRANSMITTING DEVICE 2a) | 165 |
| (ID RECEIVING DEVICE 3a, ID TRANSMITTING DEVICE 2b) | 200 |
| ⋮ | ⋮ |
| (ID RECEIVING DEVICE 3b, ID TRANSMITTING DEVICE 2a) | 178 |
| (ID RECEIVING DEVICE 3b, ID TRANSMITTING DEVICE 2b) | 154 |
| ⋮ | ⋮ |

FIG. 5

[EXAMPLE OF RECEPTION PATTERN COMPARISON RESULT]

| REFERENCE POSITION | INTER-PATTERN DISTANCE |
|---|---|
| (0, 1) | 10.5 |
| (0, 2) | 25.0 |
| ⋮ | ⋮ |
| (1, 1) | 3.8 |
| (1, 2) | 4.5 |
| ⋮ | ⋮ |

FIG. 6

METHOD OF CALCULATING EUCLID DISTANCE dist BETWEEN TWO VECTORS va AND vb $$va = \begin{pmatrix} va_1 \\ va_2 \\ \vdots \\ va_n \end{pmatrix} \quad vb = \begin{pmatrix} vb_1 \\ vb_2 \\ \vdots \\ vb_n \end{pmatrix}$$

$$dist = \sqrt{\sum_{k=1}^{n} (va_k - vb_k)^2}$$

FIG. 7

METHOD OF CALCULATING CITY-BLOCK DISTANCE dist BETWEEN TWO VECTORS va AND vb $$va = \begin{pmatrix} va_1 \\ va_2 \\ \vdots \\ va_n \end{pmatrix} \quad vb = \begin{pmatrix} vb_1 \\ vb_2 \\ \vdots \\ vb_n \end{pmatrix}$$

$$dist = \sum_{k=1}^{n} |va_k - vb_k|$$

FIG. 10

[EXAMPLE OF RECEPTION PROBABILITY PATTERN]

| SET OF ID RECEIVING DEVICE AND ID TRANSMITTING DEVICE | RECEPTION PROBABILITY |
|---|---|
| (ID RECEIVING DEVICE 3a, ID TRANSMITTING DEVICE 2a) | 0.2 |
| (ID RECEIVING DEVICE 3a, ID TRANSMITTING DEVICE 2b) | 0.4 |
| ⋮ | ⋮ |
| (ID RECEIVING DEVICE 3b, ID TRANSMITTING DEVICE 2a) | 0.1 |
| (ID RECEIVING DEVICE 3b, ID TRANSMITTING DEVICE 2b) | 0.6 |
| ⋮ | ⋮ |

FIG. 11

| REFERENCE POSITION | RECEPTION PROBABILITY PATTERN |
|---|---|
| (0, 1) | [RECEPTION PROBABILITY PATTERN 01] |
| (0, 2) | [RECEPTION PROBABILITY PATTERN 02] |
| ⋮ | ⋮ |
| (1, 1) | [RECEPTION PROBABILITY PATTERN 11] |
| (1, 2) | [RECEPTION PROBABILITY PATTERN 12] |
| ⋮ | ⋮ |

[EXAMPLE OF RECEPTION PROBABILITY PATTERN]

| SET OF ID RECEIVING DEVICE AND ID TRANSMITTING DEVICE | RECEPTION PROBABILITY |
|---|---|
| (ID RECEIVING DEVICE 3a, ID TRANSMITTING DEVICE 2a) | 0.2 |
| (ID RECEIVING DEVICE 3a, ID TRANSMITTING DEVICE 2b) | 0.4 |
| ⋮ | ⋮ |
| (ID RECEIVING DEVICE 3b, ID TRANSMITTING DEVICE 2a) | 0.1 |
| (ID RECEIVING DEVICE 3b, ID TRANSMITTING DEVICE 2b) | 0.6 |
| ⋮ | ⋮ |

FIG. 14

[EXAMPLE OF RECEPTION PATTERN OCCURRENCE PROBABILITY CALCULATION RESULT]

| REFERENCE POSITION | RECEPTION PATTERN OCCURRENCE PROBABILITY |
|---|---|
| (0, 1) | 0.5 |
| (0, 2) | 0.2 |
| ⋮ | ⋮ |
| (1, 1) | 0.9 |
| (1, 2) | 0.8 |
| ⋮ | ⋮ |

FIG. 15

LET $i$-TH COMPONENT OF RECEPTION PROBABILITY PATTERN CORRESPONDING TO $k$-TH REFERENCE POSITION BE DEFINED AS $r_{i,k}$. RECEPTION PATTERN OCCURRENCE PROBABILITY $P_k$ CORRESPONDING TO $k$-TH REFERENCE POSITION CAN BE CALCULATED AS FOLLOWS.

$$P_k = \prod_i R_i$$

WHERE, $R_i = \begin{cases} r_{i,k} & : \text{WHEN } i\text{-TH COMPONENT OF RECEPTION PATTERN HAS BEEN RECEIVED} \\ 1 - r_{i,k} & : \text{WHEN } i\text{-TH COMPONENT OF RECEPTION PATTERN HAS NOT BEEN RECEIVED} \end{cases}$

FIG. 16

LET $i$-TH COMPONENT OF RECEPTION PATTERN AND RECEPTION FEATURE QUANTITY OCCURRENCE PROBABILITY DISTRIBUTION PATTERN (PROBABILITY THAT $i$-TH COMPONENT OF RECEPTION PATTERN BECOMES $v$ AT $k$-TH REFERENCE POSITION) BE DEFINED AS $v_i$, AND $s_k(v)$, RESPECTIVELY, RCEPTION PATTERN OCCURRENCE PROBABILITY $P_k$, WHICH CORRESPONDS TO $k$-TH REFERENCE POSITION, CAN BE CALCULATED AS FOLLOWS.

$$P_k = \prod_i s_k(v_i)$$

FIG. 17

$$Bel(x_t) = \alpha_t p(z_t|x_t) Bel^-(x_t)$$

$$Bel^-(x_t) = \int p(x_t|x_{t-1}) Bel(x_{t-1}) dx_{t-1}$$

$t$ : TIME $x_t$ : POSITION OF OBJECT WHEN TIME IS $t$ (HEREINAFTER, REFERRED TO AS POSITION)

$z_t$ : RECEPTION PATTERN GENERATED BY RECEPTION PATTERN GENERATING MEANS WHEN TIME IS $t$ (HEREINAFTER, REFERRED TO AS OBSERVATION QUANTITY)

$Bel(x_t)$ : PROBABILITY THAT OBJECT EXISTS AT POSITION $x_t$ WHEN TIME IS $t$ (HEREINAFTER, REFERRED TO AS POSTERIOR PROBABILITY)

$Bel^-(x_t)$ : PRIMARY PROCESS RESULT (HEREINAFTER, REFERRED TO AS PRIMARY PROCESS RESULT)

$p(z_t|x_t)$ : PROBABILITY THAT OBSERVATION QUANTITY $z_t$ CAN BE OBTAINED WHEN OBJECT EXISTS AT POSITION $x_t$ (HEREINAFTER, REFERRED TO AS PRIOR PROBABILITY)

$p(x_t|x_{t-1})$ : PROBABILITY THAT OBJECT THAT EXISTED AT POSITION $x_{t-1}$ WHEN TIME WAS $t$-1 MIGRATES TO POSITION $x_t$ WHEN TIME IS $t$ (HEREINAFTER, REFERRED TO AS STATUS TRANSITION PROBABILITY)

$\alpha_t$ : NORMALIZATION FACTOR (FACTOR FOR MAKING ADJUSTMENT SO THAT SUM OF POSTERIOR PROBABILITIES BECOMES 1)

$$\alpha_t = \frac{1}{\int \left[ p(z_t|x_t) \int p(x_t|x_{t-1}) Bel(x_{t-1}) dx_{t-1} \right] dx_t}$$

$$p(x_t | x_{t-1}) = \begin{cases} 0 & (b < |x_t - x_{t-1}|) \\ \beta \left(1 + \dfrac{|x_t - x_{t-1}| - a}{b - a}\right) & (a < |x_t - x_{t-1}| \leq b) \\ \beta & (|x_t - x_{t-1}| \leq a) \end{cases}$$

$a$ : CONSTANT (SEE RIGHT FIGURE)
$b$ : CONSTANT (SEE RIGHT FIGURE)
$\beta$ : NORMALIZATION FACTOR (FACTOR FOR MAKING ADJUSTMENT SO THAT SUM OF STATUS TRANSITION PROBABILITIES BECOMES 1)

$$\beta = \dfrac{1}{a + b}$$

$$p(z_t | x_t = pos_k) = \begin{cases} 0 & (dist_k \geq dist') \\ 1 - \dfrac{dist_k}{dist'} & (dist_k < dist') \end{cases}$$

$dist_k$ : $k$-TH INTER-PATTERN DISTANCE $dist'$ : INTER-PATTERN DISTANCE CONSTANT

FIG. 28

PROBABILITY THAT TAG TRANSMITS ID $k$ TIMES DURING TIME $t$ (OBEYS POISSON PROCESS)

$$P_c(t,k) = e^{-\lambda t}\frac{(\lambda t)^k}{k!}$$

$\lambda$ : NUMER OF TIMES OF TRANSMISSION PER UNIT TIME

PROBABILITY THAT ID TRANSMITTED BY CERTAIN TAG, OUT OF ALL OF $N$ TAGS, CAN BE RECEIVED (NO SIGNAL COLLISION OCCURS)

$$P_s(N) = P_c(2p_0, 0)^{N-1} = e^{-2\lambda(N-1)p_0}$$

$P_0$ : COMMUNICATION TIME REQUIRED FOR ONE-TIME TRANSMISSION

PROBABILITY THAT ID CAN BE RECEIVED AT LEAST ONE TIME DURING RECEPTION TIME $t$ $$P_r(N,t) = 1 - \left(1 - e^{-2\lambda(N-1)p_0}\right)^{\lambda t}$$

POSITION ESTIMATING SYSTEM, POSITION ESTIMATING METHOD, POSITION ESTIMATING DEVICE AND ITS PROGRAM

APPLICABLE FIELD IN THE INDUSTRY

The present invention relates to a position estimating system employing radio communication, and more particularly to a technology of a position estimating system that enables a position of an object to be estimated by employing a radio transmitter and a radio receiver installed in an environment.

BACKGROUND ART

Conventionally, the position estimating system utilizing radio communication has been employed as a system for employing a radio transmitter and a radio receiver to estimate a position of an object.

In Patent document 1, Patent document 2, Patent document 3, and Patent document 4 the technology is disclosed of installing a radio receiver in a location of which the position is known, receiving an inherent ID being transmitted from a radio transmitter, with which the object has been equipped, with the radio receiver, and estimating a position of the object by making a reference to the location of the radio receiver. In Patent document 5 and Patent document 6, the technology is disclosed of installing a radio transmitter transmitting an inherent ID in a location of which the position is known, specifying the radio transmitter from the inherent ID received by the radio receiver with which the object has been equipped, and estimating a position of the object by making a reference to the location of the specified radio transmitter. In Patent document 7 and Patent document 8, the technology is disclosed of measuring a radio wave intensity at the moment of receiving an inherent ID being transmitted from the radio transmitter with the radio receiver, and estimating a distance between the radio transmitter and the radio receiver or comparing a radio wave intensity thereof with a pre-acquired radio wave intensity pattern, thereby to estimate a position of the object equipped with the radio transmitter or the radio receiver. In Patent document 9, the technology is disclosed of measuring an arrival time of a signal at the moment of receiving an inherent ID being transmitted from the radio transmitter with the radio receiver, thereby to estimate a distance between the radio transmitter and the radio receiver and to estimate a position of the object equipped with the radio transmitter or the radio receiver.

Further, in a radar system of Patent document 10 and Patent document 11, a distance to the object is estimated by measuring the time that elapses from reflection of the radio wave transmitted from the radio transmitter installed in a location of which the position is known upon the object to reception of the radio wave by the radio receiver installed in a location of which the position is known, and a position of the object is estimated by making a reference to the location of the radio transmitter.

Patent document 1: JP-P2001-092885A
Patent document 2: JP-3336300B
Patent document 3: JP-P2005-055186A
Patent document 4: JP-P2004-046904A
Patent document 5: JP-P2004-297334A
Patent document 6: JP-P2004-251816A
Patent document 7: JP-P2004-294403A
Patent document 8: JP-P2004-112482A
Patent document 9: JP-P2003-078947A
Patent document 10: JP-P1997-236651A
Patent document 11: JP-2679360B

DISCLOSURE OF THE INVENTION

Problems to be Solved by the Invention

The point at issue is that estimating a position of the object under a multipath environment such as an in-house necessitates equipping the object with at least one of the radio transmitter and the radio receiver.

The reason is that the position of the object that does not have the radio transmitter nor the radio receiver can not be estimated because the conventional position estimating system utilizing radio communication is a system for receiving information being transmitted from the transmitter with the receiver, and processing this received information, thereby to acquire positional information.

Further, the conventional radar system, which does not demand that the object have the radio transmitter or the radio receiver, cannot be used under the multipath environment such as an in-house in which a plurality of reflected waves or diffracted waves, or the like occur and resultantly, the radio wave environment becomes complicated.

Thereupon, the present invention has been accomplished in consideration of the above-mentioned problems, and an objective thereof lies in a point of providing the position estimating system utilizing radio communication, which does not necessitates equipping the object with an extra device also under the multipath environment such as an indoor and is capable of estimating a position of the object, and its technology.

The 1st invention for solving the above-mentioned problem, which is a position estimating system for estimating an existence position of an object, characterized in comprising: at least one transmitting device or more installed in a detection-target area; at least one receiving device or more that is installed in said detection-target area, and receives information being transmitted from said transmitting device; and a position estimating means for estimating the existence position of the object based upon a reception pattern that is obtained at the time of receiving the information of said receiving device.

The 2nd invention for solving the above-mentioned problem, in the above-mentioned invention, is characterized in that said position estimating means takes a migration range of the object into consideration at the moment of estimating the existence position of the object based upon the reception pattern.

The 3rd invention for solving the above-mentioned problem, in the above-mentioned inventions, is characterized in that said position estimating means generates a reception pattern that is comprised of a reception feature quantity being obtained from at least one combination or more out of combinations of the transmitting devices and the receiving devices.

The 4th invention for solving the above-mentioned problem, in the above-mentioned inventions, is characterized in that the information being transmitted from said transmitting device is identification information for identifying the transmitting device, and said receiving device detects the reception feature quantity for each transmitting device based upon the received identification information.

The 5th invention for solving the above-mentioned problem, in the above-mentioned inventions, is characterized in that said reception feature quantity is a received signal strength indication of the information being received by the receiving device.

The 6th invention for solving the above-mentioned problem, in the above-mentioned invention, is characterized in that said reception feature quantity is a communication quality of the information being received by the receiving device.

The 7th invention for solving the above-mentioned problem, in the above-mentioned inventions, is characterized in that said reception feature quantity is an arrival time of a radio wave or the information being received by the receiving device.

The 8th invention for solving the above-mentioned problem, in the above-mentioned inventions, is characterized in that said position estimating means comprises: a reference reception pattern database in which an existence position of the object and a reference reception pattern in the case that the object exists in this existence position have been stored correspondingly; and a means for comparing said reception pattern with said reference reception pattern, retrieving the existence position corresponding to the reference reception pattern that most approximates said reception pattern from said reference reception pattern database, and estimating an existence position of the object from this existence position.

The 9th invention for solving the above-mentioned problem, in the above-mentioned inventions, is characterized in that said position estimating means comprises: a reference reception situation database in which an existence position of the object and a reception situation in the case that the object exists in this existence position have been stored correspondingly; a means for calculating a reception pattern occurrence probability from said reception pattern and said reception situation; and a body position selecting means for estimating an existence position of the body from the calculated reception pattern occurrence probability.

The 10th invention for solving the above-mentioned problem, in the above-mentioned inventions, is characterized in that said reference reception situation database correspondingly stores an existence position of the object and a reception probability pattern in the case that the object exists in this existence position.

The 11th invention for solving the above-mentioned problem, in the above-mentioned inventions, is characterized in that said reference reception situation database correspondingly stores an existence position of the object and a reception feature quantity occurrence probability distribution pattern in the case that the object exists in this existence position.

The 12th invention for solving the above-mentioned problem, in the above-mentioned inventions, is characterized in that said body position selecting means retrieves from said reference reception situation database the existence position corresponding to the reception situation such that said reception pattern occurrence probability is maximized, and estimates an existence position of the object from this existence position.

The 13th invention for solving the above-mentioned problem, in the above-mentioned inventions, is characterized in that said position estimating means comprises: a reference reception pattern database in which an existence position of the object and a reference reception pattern in the case that the object exists in this existence position have been stored correspondingly; a means for calculating a reception pattern occurrence probability from an inter-reception-pattern distance obtained by comparing said reception pattern and said reference reception pattern; and a body position selecting means for estimating an existence position of the object from the calculated reception pattern occurrence probability.

The 14th invention for solving the above-mentioned problem, in the above-mentioned inventions, is characterized in that said body position selecting means retrieves from said reference reception situation database the existence position corresponding to the reference reception pattern such that said reception pattern occurrence probability is maximized, and estimates an existence position of the object from this existence position.

The 15th invention for solving the above-mentioned problem, in the above-mentioned inventions, is characterized in that said body position selecting means estimates an existence position of the object from said reception pattern occurrence probability with a filtering employing a probability inference.

The 16th invention for solving the above-mentioned task, which is a position estimating method for estimating an existence position of an object, characterized in comprising of estimating the existence position of the object based upon a reception pattern that is obtained at the time of receiving the information of at least one receiving device or more that receives signal being transmitted from at least one transmitting device.

The 17th invention for solving the above-mentioned problem, in the above-mentioned invention, is characterized in comprising of estimating the existence position of the object based upon a reception pattern, in consideration of a migration range of the object.

The 18th invention for solving the above-mentioned problem, in the above-mentioned inventions, is characterized in comprising of: generating a reception pattern that is comprised of a reception feature quantity being obtained from at least one combination or more out of combinations of the transmitting devices and the receiving devices and estimating the existence position of the object based upon said reception pattern.

The 19th invention for solving the above-mentioned problem, in the above-mentioned inventions, is characterized in that the information being transmitted from said transmitting device is identification information for identifying the transmitting device, and said receiving device detects the reception feature quantity for each transmitting device based upon the received identification information.

The 20th invention for solving the above-mentioned problem, in the above-mentioned inventions, is characterized in that said reception feature quantity is a received signal strength indication of the information being received by the receiving device.

The 21st invention for solving the above-mentioned problem, in the above-mentioned inventions, is characterized in that said reception feature quantity is a communication quality of the information being received by the receiving device.

The 22nd invention for solving the above-mentioned problem, in the above-mentioned inventions, is characterized in that said reception feature quantity is an arrival time of a radio wave or the information being received by the receiving device.

The 23rd invention for solving the above-mentioned problem, in the above-mentioned inventions, is characterized in comprising of: storing a reference reception pattern in which an existence position of the object and a reference reception pattern in the case that the object exists in this existence position and comparing said reception pattern with said reference reception pattern, retrieving the existence position corresponding to the reference reception pattern that most approximates said reception pattern from said stored reference reception pattern, and estimating an existence position of the object from this existence position.

The 24th invention for solving the above-mentioned problem, in the above-mentioned inventions, is characterized in comprising: a reference reception situation storing process of storing previously an existence position of the object and a reception situation in the case that the object exists in this existence position; a calculating process of calculating a reception pattern occurrence probability from said reception pattern and said reception situation; and a body position selecting process of estimating an existence position of the body from the calculated reception pattern occurrence probability.

The 25th invention for solving the above-mentioned problem, in the above-mentioned inventions, is characterized in that said reference reception situation storing process correspondingly stores an existence position of the object and a reception probability pattern in the case that the object exists in this existence position.

The 26th invention for solving the above-mentioned problem, in the above-mentioned inventions, is characterized in that said reference reception situation storing process correspondingly stores an existence position of the object and a reception feature quantity occurrence probability distribution pattern in the case that the object exists in this existence position.

The 27th invention for solving the above-mentioned problem, in the above-mentioned inventions, is characterized in that said body position selecting process retrieves from said reference reception situation being stored by said reference reception situation storing process the existence position corresponding to the reception situation such that said reception pattern occurrence probability is maximized, and estimates an existence position of the object from this existence position.

The 28th invention for solving the above-mentioned problem, in the above-mentioned inventions, is characterized in comprising: a reference reception situation storing process of storing previously an existence position of the object and a reference reception pattern in the case that the object exists in this existence position have been stored correspondingly; a calculating process of calculating a reception pattern occurrence probability from an inter-reception-pattern distance obtained by comparing said reception pattern and said reference reception pattern; and a body position selecting process of estimating an existence position of the object from the calculated reception pattern occurrence probability.

The 29th invention for solving the above-mentioned problem, in the above-mentioned inventions, is characterized in that said body position selecting process retrieves from said reference reception situation being stored by said reference reception situation storing process the existence position corresponding to the reference reception pattern such that said reception pattern occurrence probability is maximized, and estimates an existence position of the object from this existence position.

The 30th invention for solving the above-mentioned problem, in the above-mentioned inventions, is characterized in that said body position selecting process estimates an existence position of the object from said reception pattern occurrence probability with a filtering employing a probability inference.

The 31st invention for solving the above-mentioned task, which is a program for estimating an existence position of an object, characterized in causing an information processing unit to execute a estimating position process of estimating the existence position of the object based upon a reception pattern that is obtained at the time of receiving the information of at least one receiving device or more that receives signal being transmitted from at least one transmitting device.

The 32nd invention for solving the above-mentioned problem, in the above-mentioned invention, is characterized in that said estimating position process estimates the existence position of the object in consideration of a migration range of the object.

The 33rd invention for solving the above-mentioned problem, in the above-mentioned inventions, is characterized in that said estimating position process generates a reception pattern that is comprised of a reception feature quantity being obtained from at least one combination or more out of combinations of the transmitting devices and the receiving devices.

The 34th invention for solving the above-mentioned problem, in the above-mentioned inventions, is characterized in that the information being transmitted from said transmitting device is identification information for identifying the transmitting device, and said receiving device detects the reception feature quantity for each transmitting device based upon the received identification information.

The 35th invention for solving the above-mentioned problem, in the above-mentioned inventions, is characterized in that said reception feature quantity is a received signal strength indication of the information being received by the receiving device.

The 36th invention for solving the above-mentioned problem, in the above-mentioned inventions, is characterized in that said reception feature quantity is a communication quality of the information being received by the receiving device.

The 37th invention for solving the above-mentioned problem, in the above-mentioned inventions, is characterized in that said reception feature quantity is an arrival time of a radio wave or the information being received by the receiving device.

The 38th invention for solving the above-mentioned problem, in the above-mentioned inventions, is characterized in that said estimating position process comprises retrieving the existence position corresponding to the reference reception pattern that most approximates said reception pattern from a reference reception pattern database in which an existence position of the object and a reference reception pattern in the case that the object exists in this existence position have been stored correspondingly, and estimating an existence position of the object from this existence position.

The 39th invention for solving the above-mentioned problem, in the above-mentioned inventions, is characterized in that said estimating position process comprises: a reference reception situation database in which an existence position of the object and a reception situation in the case that the object exists in this existence position have been stored correspondingly; and a process of calculating a reception pattern occurrence probability from said reception pattern and said reception situation; and a body position selecting process of estimating an existence position of the body from the calculated reception pattern occurrence probability.

The 40th invention for solving the above-mentioned problem, in the above-mentioned inventions, is characterized in that said reference reception situation database correspondingly stores an existence position of the object and a reception probability pattern in the case that the object exists in this existence position.

The 41st invention for solving the above-mentioned problem, in the above-mentioned inventions, is characterized in that said reference reception situation database correspondingly stores an existence position of the object and a reception feature quantity occurrence probability distribution pattern in the case that the object exists in this existence position.

The 42nd invention for solving the above-mentioned problem, in the above-mentioned inventions, is characterized in that said body position selecting process retrieves from said reference reception situation database the existence position corresponding to the reception situation such that said reception pattern occurrence probability is maximized, and estimates an existence position of the object from this existence position.

The 43rd invention for solving the above-mentioned problem, in the above-mentioned inventions, is characterized in that said estimating position process comprises: a reference reception pattern database in which an existence position of the object and a reference reception pattern in the case that the object exists in this existence position have been stored correspondingly; and a process of calculating a reception pattern occurrence probability from an inter-reception-pattern distance obtained by comparing said reception pattern and said reference reception pattern; and a body position selecting process of estimating an existence position of the object from the calculated reception pattern occurrence probability.

The 44th invention for solving the above-mentioned problem, in the above-mentioned inventions, is characterized in that said body position selecting process retrieves from said reference reception situation database the existence position corresponding to the reference reception pattern such that said reception pattern occurrence probability is maximized, and estimates an existence position of the object from this existence position.

The 45th invention for solving the above-mentioned problem, in the above-mentioned inventions, is characterized in that said body position selecting process estimates an existence position of the object from said reception pattern occurrence probability with a filtering employing a probability inference.

A first position estimating system of the present invention includes at least one transmitting device or more (2a, 2b, ... of FIG. 2) installed in a detection-target area, at least one receiving device or more (3a, 3b, ... of FIG. 2) that is installed in the detection-target area, and receives information being transmitted from the transmitting device, a reception pattern generating means (41 of FIG. 2) for generating a reception pattern that is obtained at the time of receiving the information of the receiving device, a reference reception pattern storing unit (42 of FIG. 2) for pre-storing the reception patterns that are obtained when the objects exist in a plurality of positions, a reception pattern comparing means (43 of FIG. 2) for comparing the reception pattern generated by the reception pattern generating means with the reception pattern pre-stored in the reference reception pattern storing unit, and a body position selecting means (44 of FIG. 2) for estimating a position of the object based upon a comparison result by the reception pattern comparing means. Employing such a configuration, and utilizing the fact that the reception pattern changes responding to a position of the object make it possible to estimate a position of the object from the reception pattern, and hence to accomplish an objective of the present invention.

A second position estimating system of the present invention includes a reference reception situation storing unit (45 of FIG. 9) for pre-storing reception situations that are obtained when the objects exist in a plurality of positions instead of the reference reception pattern storing unit in the first position estimating system, includes a reception pattern occurrence probability calculating means (46 of FIG. 9) for calculating an occurrence probability of the reception pattern from the reception pattern generated by the reception pattern generating means and the reception situation pre-stored in the reference reception situation storing unit instead of the reception pattern comparing means in the first position estimating system, and includes a body position selecting means (47 of FIG. 9) for estimating a position of the object based upon a calculation result by the reception pattern occurrence probability calculating means instead of the body position selecting means in the first position estimating system. Employing such a configuration, and utilizing the fact that the reception pattern changes responding to a position of the object make it possible to estimate a position of the object from the reception pattern, and hence to accomplish an objective of the present invention.

A third position estimating system of the present invention includes a reception pattern occurrence probability calculating means (48 of FIG. 21) for calculating an occurrence probability of the reception pattern from a comparison result by the reception pattern comparing means, and a body position selecting means (47 of FIG. 21) for estimating a position of the object based upon a calculation result by the reception pattern occurrence probability calculating means instead of the body position selecting means in the first position estimating system. Employing such a configuration, and utilizing the fact that the reception pattern changes responding to a position of the object make it possible to estimate a position of the object from the reception pattern, and hence to accomplish an objective of the present invention.

An Advantageous Effect of the Invention

The effect of the present invention lies in a point that only with the transmitting device and the receiving device installed in the environment, a position of the object equipped with no extra device can be estimated even in the multipath environment such as an indoor.

The reason is that a position of the object can be estimated by utilizing the fact that the reception pattern, which is comprised of a reception feature quantity of the receiving device having received information transmitted from the transmitting device installed in the environment, changes responding to a position of the object.

BRIEF DESCRIPTION OF THE DRAWINGS

FIG. 3 is a view illustrating an example of the reception pattern.

FIG. 4 is a view having one example shown of the reference position and the reception probability pattern that are stored in a reference reception pattern storing unit 42 in the case that a position of the object is expressed with a two-dimension coordinate.

FIG. 5 is a view illustrating one example of the reception pattern comparison result in the case that a position of the object is expressed with a two-dimension coordinate and an inter-pattern distance is expressed with a one-dimension actual-value.

FIG. 6 is a view illustrating a method of calculating a Euclid distance between two vectors.

FIG. 7 is a view illustrating a method of calculating a city-block distance between two vectors.

FIG. 10 is a view illustrating an example of the reception probability pattern.

FIG. 11 is a view having one example shown of the reference position and the reception probability pattern that are stored in a reference reception situation storing unit 45 in the case that a position of the object is expressed with a two-dimension coordinate.

FIG. 14 is a view illustrating one example of a reception pattern occurrence probability calculation result in the case that a position of the object is expressed with a two-dimension coordinate.

FIG. 15 is a view illustrating one example of a method of calculating a reception pattern occurrence probability from the reception pattern and the reception probability pattern.

FIG. 16 is a view illustrating one example of a method of calculating a reception pattern occurrence probability from the reception pattern and the reception feature quantity occurrence probability distribution pattern.

FIG. 17 is a view having a method shown of calculating a filtering employing a probability inference that is applied for a reception pattern occurrence probability calculation result.

FIG. 28 is a view illustrating one example of a method of calculating a reception probability based upon a protocol in a second exemplary example of the present invention.

Figure 1:
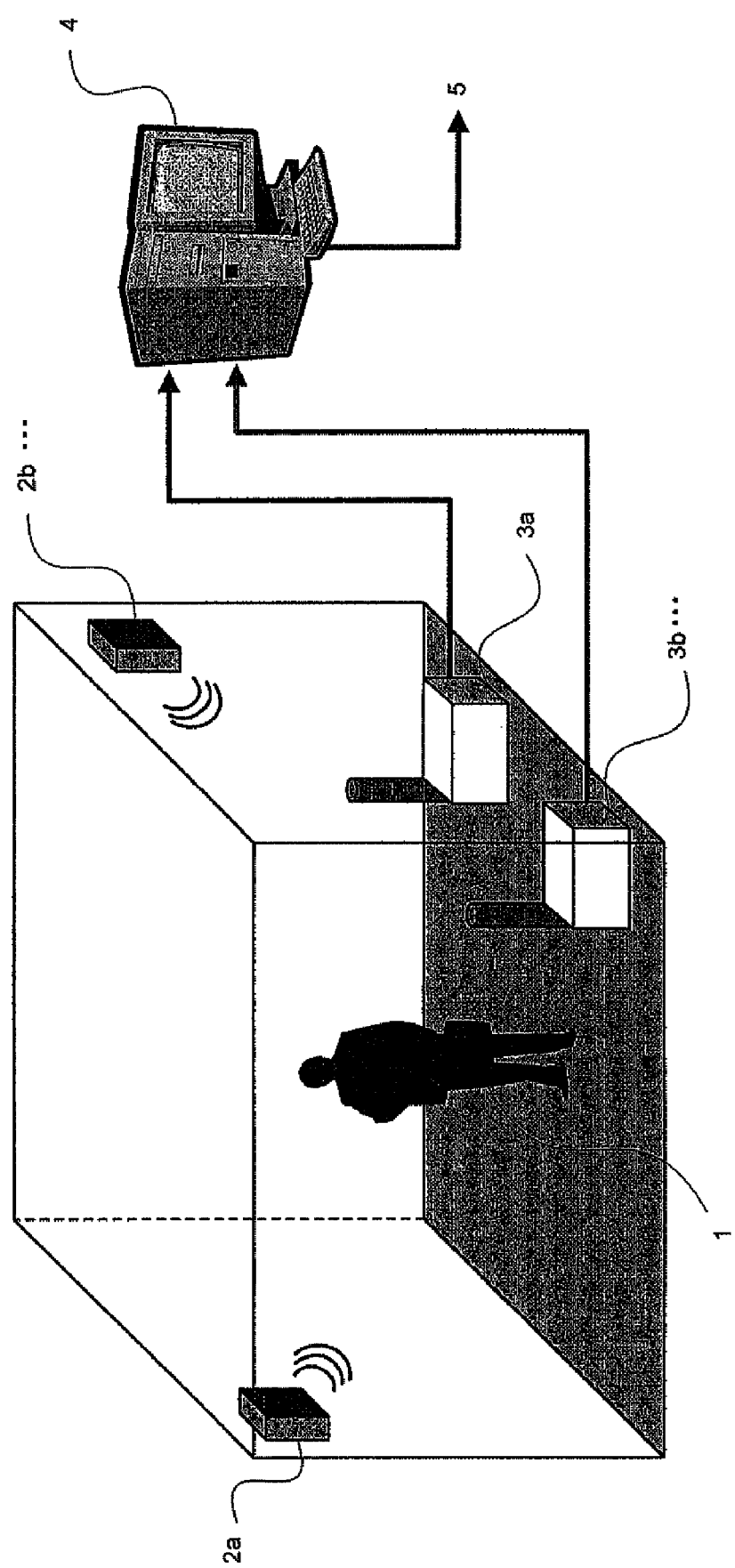
FIG. 1 is a view illustrating a summary of the best mode for carrying out a first invention of the present invention.

DESCRIPTION OF NUMERALS 1 position-estimation object
2a ID transmitting device
2b ID transmitting device
3a ID receiving device
3b ID receiving device
4 body position estimating device
41 reception pattern generating means
42 reference reception pattern storing unit
43 reception pattern comparing means
44 body position selecting means
5 body position outputting device
6 body position estimating device
45 reference reception situation storing unit
46 reception pattern occurrence probability calculating means
47 body position selecting means
7 body position estimating device
48 reception pattern occurrence probability calculating means
8 body position estimating device
9 body position estimation program

BEST MODE FOR CARRYING OUT THE INVENTION

Next, the best mode for carrying out the first invention of the present invention will be explained in details by making a reference to the accompanied drawings.

Figure 2:
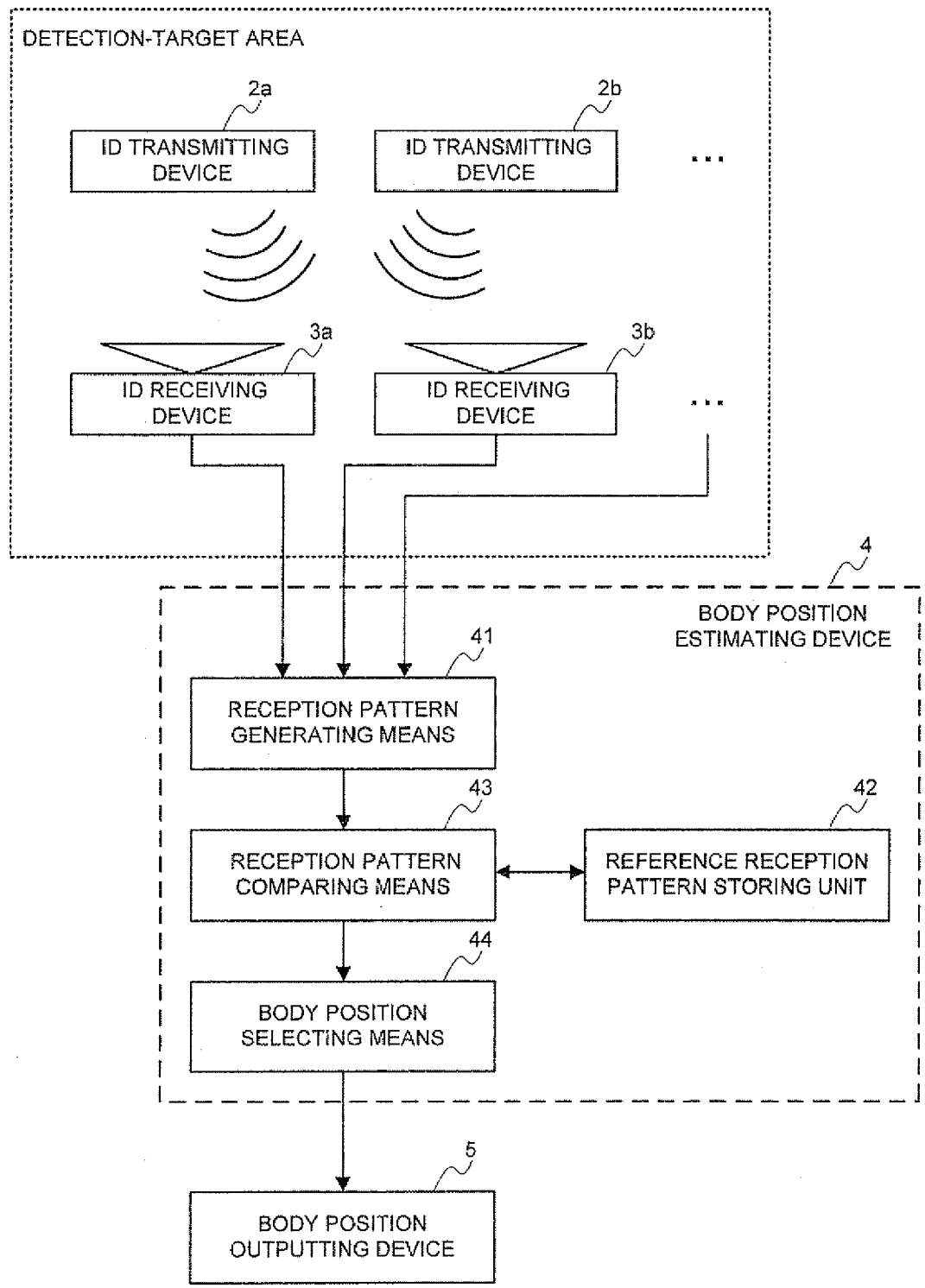
FIG. 2 is a block diagram illustrating a configuration of the best mode for carrying out the first invention of the present invention.

Upon making a reference to FIG. 1 and FIG. 2, the best mode for carrying out the first invention of the present invention includes a plurality of ID transmitting devices 2a, 2b, . . . that are installed in the environment and transmits an inherent ID, which each ID transmitting device has, with radio communication, a plurality of ID receiving devices 3a, 3b, . . . that are installed in the environment, and receive the ID, which each of the ID transmitting devices 2a, 2b, . . . transmits, with radio communication, a body position estimating device 4 for employing a reception result of the inherent IDs from the ID transmitting devices 2a, 2b, . . . obtained by the ID receiving devices 3a, 3b, . . . to estimate a position of an object 1 equipped with no extra device such as the ID transmitting devices 2a, 2b, . . . or the ID receiving devices 3a, 3b, . . . , and a body position outputting device 5 for outputting an estimation result.

The ID receiving devices 3a, 3b, . . . receive the inherent IDs being transmitted from the ID transmitting devices 2a, 2b, . . . and measure a reception feature quantity with regard to each of the received inherent IDs. Herein, the so-called reception feature quantity is at least one of a numerical value indicative of an intensity of the radio wave (hereinafter, referred to as a received signal strength indication), a numerical value indicative of a quality of the radio communication (for example, a Bit Error Rate, an S/N (an S/N ratio), and a C/N (a C/N ratio)) (hereinafter, referred to as a communication quality), and an arrival time of the radio wave or the signal from the ID transmitting device to the ID receiving device (hereinafter, referred to as an arrival time), or a combination thereof.

Additionally, the number of the ID transmitting devices 2a, 2b, . . . and that of the ID receiving devices 3a, 3b, . . . do not always need to be equalized with each other, and may differ from each other. In addition hereto, the ID transmitting device and the ID receiving device do not always need to exist plurarily, and may exist singularly, respectively.

The body position estimating device 4 includes a reception pattern generating means 41, a reference reception pattern storing unit 42, a reception pattern comparing means 43, and a body position selecting means 44.

The reception pattern generating means 41 generates and outputs a reception pattern from the inherent ID reception result of the ID transmitting device 2a, 2b, . . . obtained by the ID receiving devices 3a, 3b, . . . . The reception pattern is expressed with a feature vector having one of the received signal strength indication, the communication quality, and the arrival time, or a combination thereof as a component for each of all combinations of the ID transmitting devices 2a, 2b, . . . and the ID receiving devices 3a, 3b, . . . . For example, the reception pattern is one as shown in FIG. 3 ((ID receiving device 3a, ID transmitting device 2a), (ID receiving device 3a, ID transmitting device 2b), . . . )=(165, 200, . . . ) when the ID receiving devices 3a, 3b, . . . can measure the received signal strength indication.

The reference reception pattern storing unit 42 correspondingly stores a plurality of positions (hereinafter, referred to as a reference position), and the reception patterns obtained when the objects exist in respective reference positions. In FIG. 4, one example is shown of the text that is stored in the reference reception pattern storing unit 42 in the case that a position of the object is expressed with a two-dimension coordinate. Further, in the example shown in FIG. 4, the reference reception pattern storing unit 42 stores one reception pattern for one reference position, but may store a plurality of the reception patterns for one reference position.

The reception pattern comparing means 43 calculates an index (hereinafter, referred to as an inter-pattern distance) obtained by numerizing a difference between the reception pattern generated by the reception pattern generating means 41 and the reception pattern that corresponds to each reference position stored in the reference reception pattern storing unit 42, and outputs a reception pattern comparison result. For example, the reception pattern comparison result is expressed as shown in FIG. 5 in the case that a position of the object is expressed with a two-dimension coordinate and the inter-pattern distance is expressed with a one-dimension actual-value.

As a specific example of the reception pattern comparing means 43, there exists the technique of employing a Euclid distance between the feature vectors, each of which has a reception feature quantity of the reception pattern as a component, as an inter-pattern distance between the reception pattern generated by the reception pattern generating means 41 and the reception pattern that corresponds to each of a plurality of the reference positions pre-stored in the reference reception pattern storing unit 42. The method of calculating the Euclid distance between the two vectors is shown in FIG. 6.

As another specific example of the reception pattern comparing means 43, there exists the technique of employing a city-block distance between the feature vectors, each of which has a reception feature quantity of the reception pattern as a component, as an inter-pattern distance between the reception pattern generated by the reception pattern generating means 41 and the reception pattern that corresponds to each of a plurality of the reference positions pre-stored in the reference reception pattern storing unit 42. The method of calculating the city-block distance between the two vectors is shown in FIG. 7.

The body position selecting means 44 selects and decides a position of the object 1 from the reception pattern comparison result obtained by the reception pattern comparing means 43.

As a specific example of the body position selecting means 44, there exists the technique of selecting the reference position such that the inter-pattern distance is minimized out of the inter-pattern distances of the reception pattern comparison result obtained by the reception pattern comparing means 43 and assuming it to be a position estimation result of the object 1.

Next, an operation of the best mode for carrying out the first invention of the present invention will be explained in details by making a reference to FIG. 2 and FIG. 8.

The IDs transmitted from the ID transmitting devices 2a, 2b, . . . are received with the radio communication by the ID receiving devices 3a, 3b, . . . (step A1 of FIG. 8). The reception pattern generating means 41 generates and outputs a reception pattern from the IDs of the ID transmitting devices 2a, 2b, . . . received by the ID receiving devices 3a, 3b, . . . and one of the measured received signal strength indication, communication quality, and arrival time, or a combination thereof (step A2 of FIG. 8).

Figure 8:
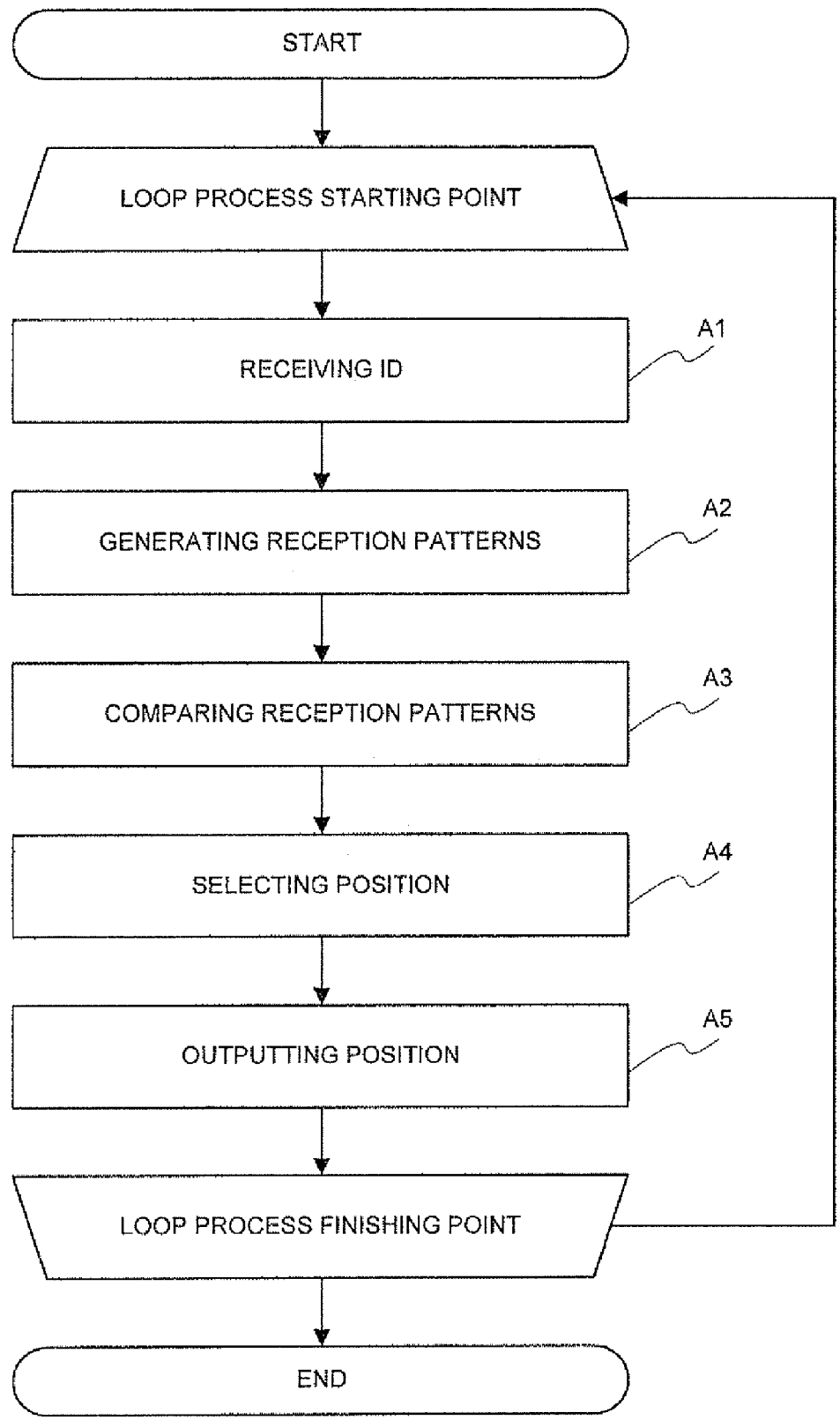
FIG. 8 is a flowchart illustrating an operation of the best mode for carrying out the first invention of the present invention.

The reception pattern comparing means 43 calculates an inter-pattern distance between the reception pattern generated by the reception pattern generating means 41 and the reception pattern that corresponds to each of a plurality of the reference positions pre-stored in the reference reception pattern storing unit 42, and outputs a reception pattern comparison result (step A3 of FIG. 8).

The body position selecting means 44 selects and decides a position of the object 1 from the reception pattern comparison result obtained by the reception pattern comparing means 43 (step A4 of FIG. 8). Comparing the reception pattern generated by the reception pattern generating means 41 and the reception pattern that corresponds to each of a plurality of the reference positions pre-stored in the reference reception pattern storing unit 42 makes it possible to estimate a position of the object because the reception pattern changes depending upon a position of the object.

The position of the object obtained by the body position selecting means 44 is output by the body position outputting device 5 (step A5 of FIG. 8).

Next, an effect of the best mode for carrying out the first invention of the present invention will be explained In the best mode for carrying out the first invention of the present invention, a position of the object equipped with no extra device can be estimated by employing the ID transmitting device and the ID receiving device installed in the environment. Further, an influence by the multipath within the environment has been already reflected into the reception patterns pre-acquired at a plurality of the reference positions. Comparing the reception pattern with such a reference reception pattern and estimating a position enables the influence by the multipath within the environment to be offset. With this, the object does not need to be equipped with the extra device such as the ID transmitting device or the ID receiving device also under the multipath environment such as an indoor, and a position of the object can be estimated by utilizing only the radio communication apparatus installed in the environment.

Additionally, in the foregoing embodiment, the reception patterns are generated from the reception feature quantities being obtained from all combinations of the ID transmitting devices and the ID receiving devices to estimate a position of the body; however so long as the range in which the body exists can be narrowed to a certain extent, a position of the body may be estimated with the reception pattern having only the reception feature quantity, which is obtained from a combination of the ID transmitting device and the ID receiving device existing in its range, as a component.

Next, the best mode for carrying out a second invention of the present invention will be explained in details by making a reference to the accompanied drawings.

Figure 9:
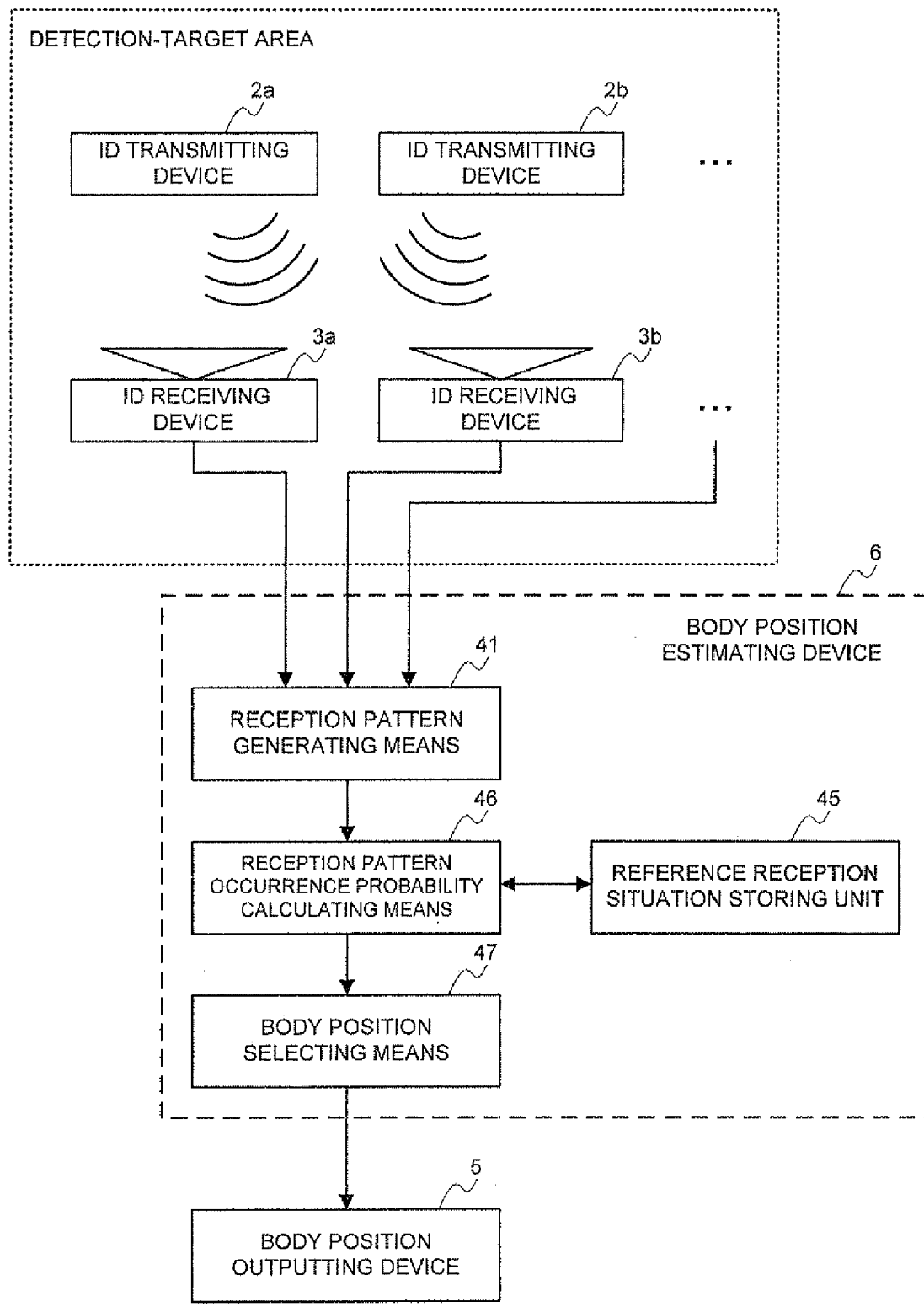
FIG. 9 is a block diagram illustrating a configuration of the best mode for carrying out a second invention of the present invention.

Upon making a reference to FIG. 9, the best mode for carrying out the second invention of the present invention differs from the best mode for carrying out the first invention of the present invention in a point that a body position estimating device 6 includes a reference reception situation storing unit 45 instead of the reference reception pattern storing unit 42 in the configuration of the body position estimating device 4 in the best mode for carrying out the first invention of the present invention shown in FIG. 2, a reception pattern occurrence probability calculating means 46 instead of the reception pattern comparing means 43, and a body position selecting means 47 instead of the body position selecting means 44.

The reference reception situation storing unit 45 correspondingly stores a plurality of the reference positions, and information (hereinafter, referred to as a reference reception situation) being generated from the inherent ID reception result that is obtained by the ID receiving devices 3a, 3b, ... when the objects exist in respective reference positions, and the reception feature quantity. The reference reception situation is information that becomes necessary for calculating a conditional probability (hereinafter, referred to as a reception pattern occurrence probability) that the reception pattern is obtained when it is supposed that the object exists in each reference position.

As a specific example of the reference reception situation, there exists a reception probability pattern acquired when the object exist in the reference position. Herein, it is assumed that the so-called reception probability is a probability that the ID receiving device can receive the inherent ID of the ID transmitting device, Even when the radio wave transmitted from the ID transmitting device has fully reached the ID receiving device, the existence position of the object is unchanged, and the surrounding radio wave environment does not fluctuate greatly, there occurs the case that the ID receiving device cannot receive the inherent ID of the ID transmitting device due to an influence by the protocol being used for radio communication between the ID receiving device and the ID transmitting device, or the like. The reception probability, which includes such an influence, is for expressing a reception possibility as a probability. The reception probability pattern is expressed with a feature vector having as a component the reception provability for each of all combinations of the ID transmitting devices 2a, 2b, ... and the ID receiving devices 3a, 3b, .... For example, the reception probability pattern is one as shown in FIG. 10 ((ID receiving device 3a, ID transmitting device 2a), (ID receiving device 3a, ID transmitting device 2b), ... )=(0.2, 0.4, ... ). In FIG. 11, one example of the text that is stored in the reference reception situation storing unit 45 in the case that a position of the object is expressed with a two-dimension coordinate.

Figure 12:
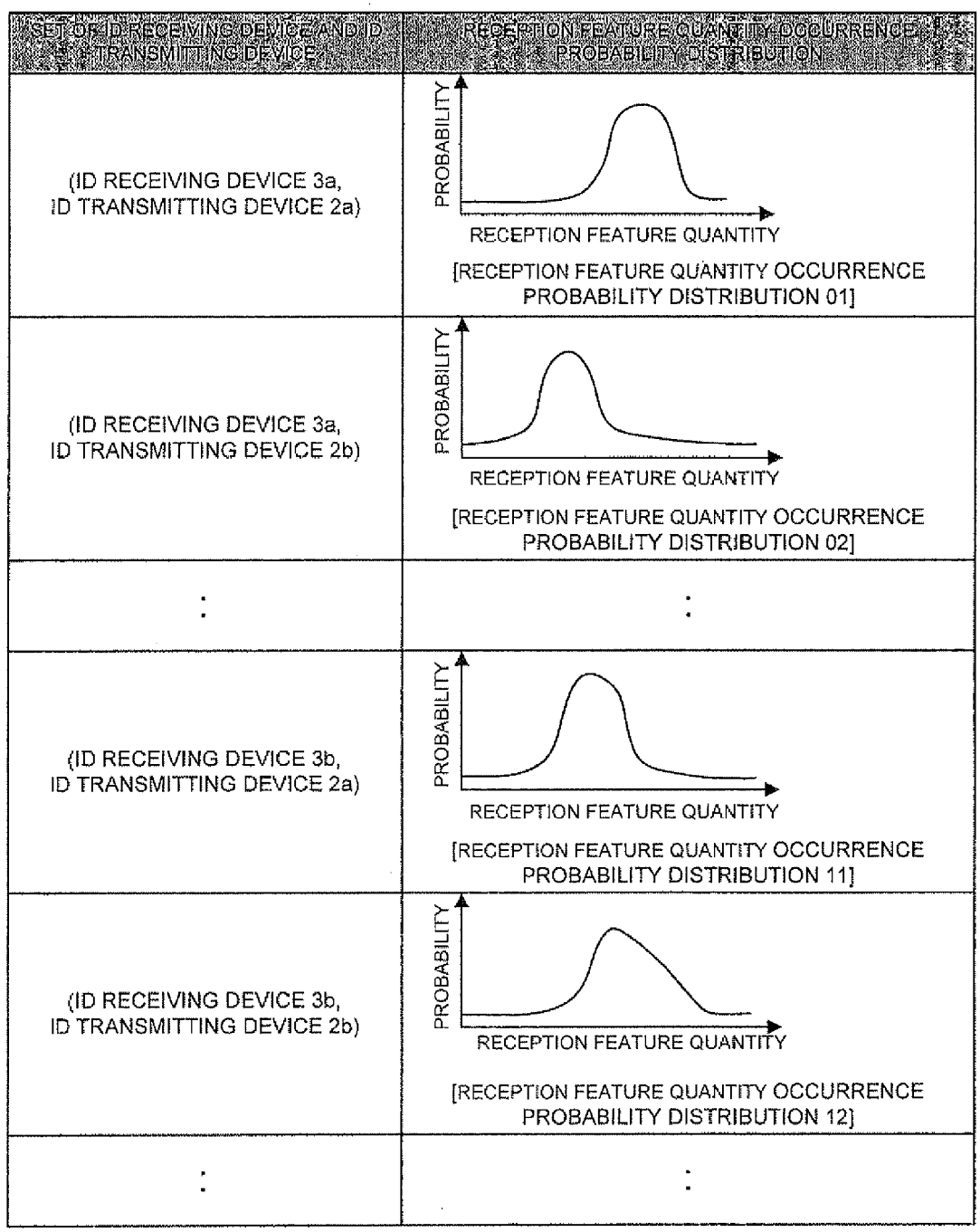
FIG. 12 is a view illustrating an example of a reception feature quantity occurrence probability distribution pattern.
Figure 13:
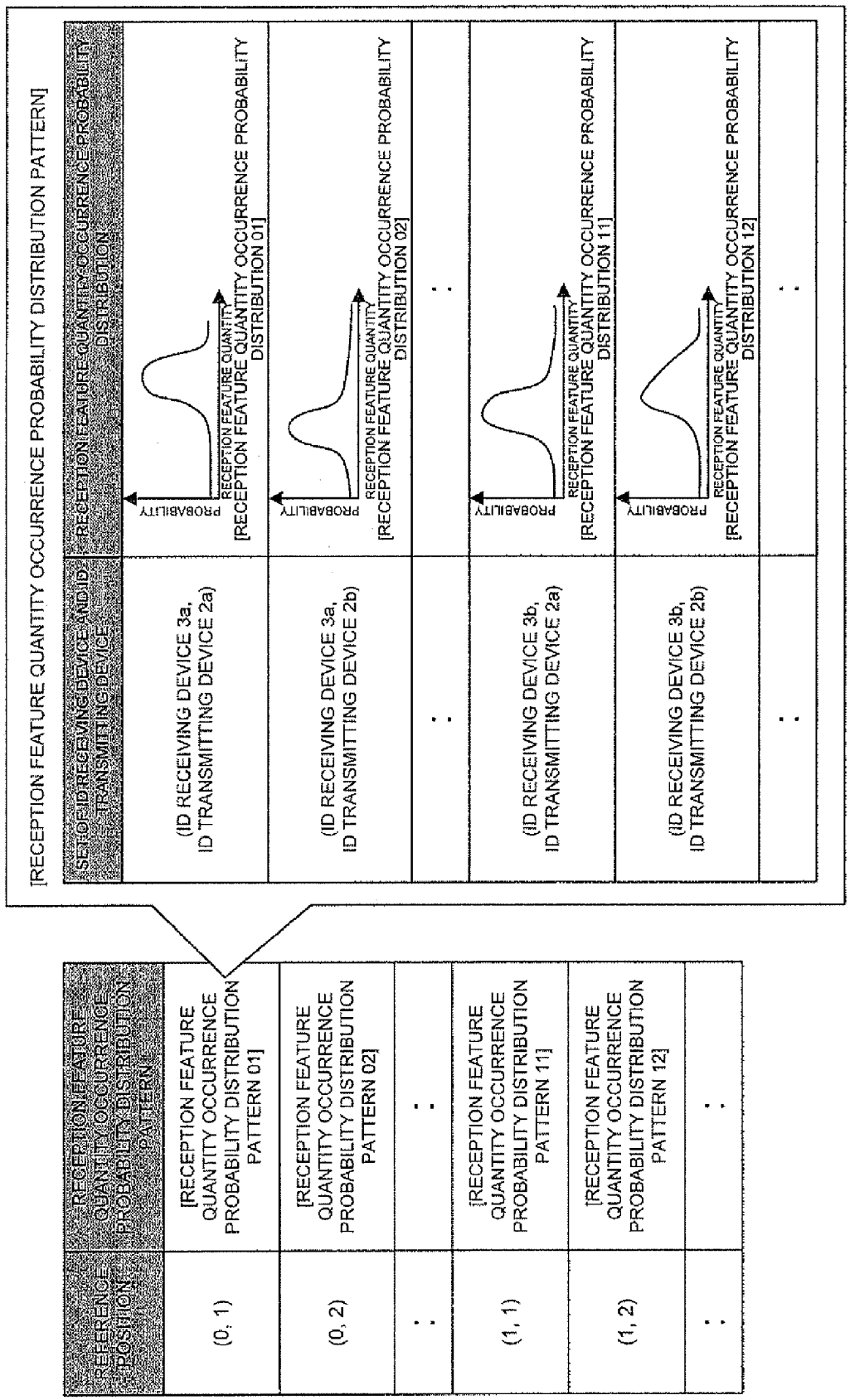
FIG. 13 is a view having one example shown of the reference position and the reception feature quantity occurrence probability distribution pattern that are stored in the reference reception situation storing unit 45 in the case that a position of the object is expressed with a two-dimension coordinate.

As another specific example of the reference reception situation, there exists a reception feature quantity occurrence probability distribution pattern acquired when the object exist in the reference position. The so-called reception feature quantity occurrence probability distribution is a probability distribution indicating the distribution in which the reception feature quantity being measured by the ID receiving device occurs stochastically. Even when the existence position of the object is unchanged, and resultantly, the surrounding radio wave environment does not fluctuate greatly, the reception feature quantity being measured by the ID receiving device fluctuates due to an influence by the protocol being used for radio communication between the ID receiving device and the ID transmitting device, an influence by noise caused by the surrounding environment and the device itself, or the like. The reception feature quantity occurrence probability distribution is for expressing such a situation of the fluctuation as a distribution of the probability that the reception feature quantity occurs. The probability that a certain reception feature quantity occurs can be obtained from the reception feature quantity occurrence probability distribution. The reception feature quantity occurrence probability distribution pattern is expressed with the feature vector having as a component the reception feature quantity occurrence probability distribution for each of all combinations of the ID transmitting devices 2a, 2b, ... and the ID receiving devices 3a, 3b, .... For example, the reception feature quantity occurrence probability distribution pattern is one as shown in FIG. 12 ((ID receiving device 3a, ID transmitting device 2a), (ID receiving device 3a, ID transmitting device 2b), ... )=(reception feature quantity occurrence probability distribution 01, reception feature quantity occurrence probability distribution 02, ... ) Herein, the reception feature quantity occurrence probability distribution may be expressed with a numerical equation such as a normalized distribution in some cases, may be expressed with a set of each of all obtainable values of the reception feature quantity and the reception feature quantity occurrence probability in some cases, and may be expressed with a set of a section obtained by appropriately dividing all obtainable values of the reception feature quantity and the reception feature quantity occurrence probability in some cases. In FIG. 13, one example is shown of the text that is stored in the reference reception situation storing unit 45 in the case that a position of the object is expressed with a two-dimension coordinate.

The reception pattern occurrence probability calculating means 46 calculates and outputs a reception pattern occurrence probability from the reception pattern generated by the reception pattern generating means 41 and the reference reception situation caused to correspond to each reference position stored in the reference reception situation storing unit 45. For example, the reception pattern occurrence probability calculation result in the case that a position of the object is expressed with a two-dimension coordinate is expressed as shown in FIG. 14.

As a specific example of the reception pattern occurrence probability calculating means 46, there exists the technique of calculating the reception pattern occurrence probability with the method shown in FIG. 15 when the reception probability pattern has been stored as a reference reception situation in the reference reception situation storing unit 45. In the method shown in FIG. 15, the probability (the probability that the reception is made, or the probability that no reception is made) that the obtained reception feature quantity occurs is obtained for each component of the reception pattern from the reception pattern and the reception probability pattern that corresponds to each reference position to assume that the value obtained by multiplying each of them by the other in all is a reception pattern occurrence probability. This makes it possible to calculate the reception pattern occurrence probability for each reference position stored in the reference reception situation storage device 45, and to output a reception pattern occurrence probability calculation result.

As another specific example of the reception pattern occurrence probability calculating means 46, there exists the technique of calculating the reception pattern occurrence probability with the method shown in FIG. 16 when the reception feature quantity occurrence probability distribution pattern has been stored as a reference reception situation in the reference reception situation storing unit 45. In the method shown in FIG. 16r the probability (the reception feature quantity occurrence probability that is obtained from the reception feature quantity occurrence probability distribution corresponding to the component of the reception pattern) that the obtained reception feature quantity occurs is obtained for each component of the reception pattern from the reception pattern and the reception feature quantity occurrence probability distribution pattern that corresponds to each reference position to assume that the value obtained by multiplying each of them by the other in all is a reception pattern occurrence probability. This makes it possible to calculate the reception pattern occurrence probability for each reference position stored in the reference reception situation storage device 45, and to output a reception pattern occurrence probability calculation result.

The body position selecting means 47 selects and decides a position of the object 1 from the reception pattern occurrence probability calculation result obtained by the reception pattern occurrence probability calculating means 46.

As a specific example of the body position selecting means 47, there exists the technique of selecting the reference position such that the reception pattern occurrence probability is maximized out of the reception pattern occurrence probabilities of the reception pattern occurrence probability calculation result obtained by the reception pattern occurrence probability calculating means 46 and assuming it to be a position estimation result of the object 1.

Figure 18:
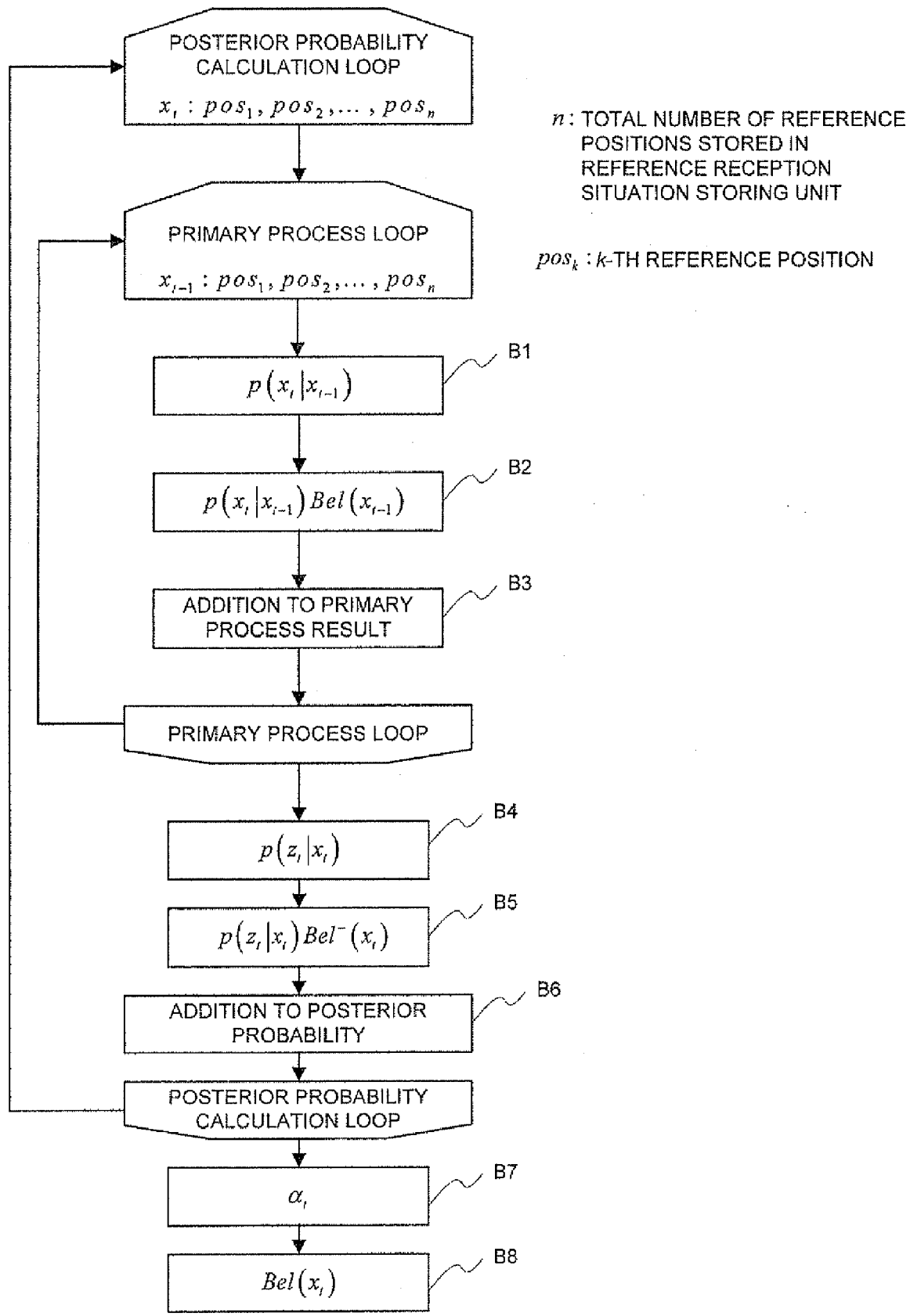
FIG. 18 is a flowchart illustrating a method of calculating a filtering employing a probability inference that is applied for a reception pattern occurrence probability calculation result.
Figure 19:
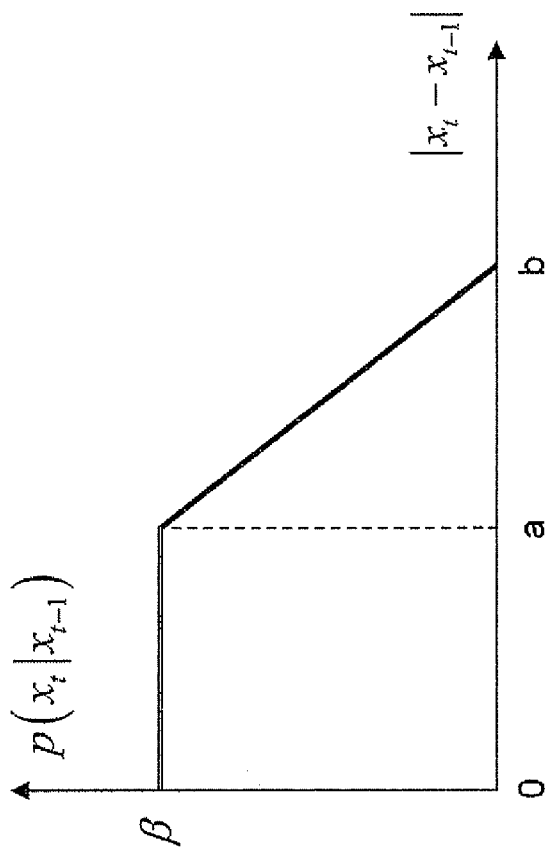
FIG. 19 is a view illustrating one example of a method of calculating a status transition probability.

As another specific example of the body position selecting means 47, there exists the technique of estimating a position of the object 1 from the reception pattern occurrence probability calculation result obtained by the reception pattern occurrence probability calculating means 46 with the filtering employing a probability inference (Bayesian Filtering/the reference document: Dieter Fox, Jeffrey Hightower, Lin Liao, Dirk Schulz, and Gaetano Borriello, Bayesian Filtering for Location Estimation, PERVASIVE Computing July-September 2003, pp. 24-33). The method of calculating the filtering employing the probability inference is shown in FIG. 17, and an operation thereof is shown in FIG. 18. In this example, the status transition probability is calculated with a calculation equation shown in FIG. 19 (step B1 of FIG. 18). The status transition probability calculated like this has such a property of restraining a migration range of the object. Two constants a and b in the calculation equation shown in FIG. 19 can be decided responding to a detection-target migration speed. For example, in the case that a person, who is walking, is envisaged as a detection target, a and b can be set to 0.50 m, and 1.0 m, respectively. This is equivalent to putting a limit to the migration speed, i.e. the possibility that the migration speed of a person becomes 1.0÷0.5=2.0 m/s or more when an origination time period of the ID transmitting device is 0.5 sec. does not exist. Calculating a product of the status transition probability calculated in the step B1 of FIG. 18 and a posterior probability ahead of one unit time (step B2 of FIG. 18), and thereafter calculating a sum of the total in a primary process loop (step B3 of FIG. 18) make it possible to obtain a sum of the probabilities (a primary process result) that the object migrates to each reference position from all reference positions. Next, the reception pattern occurrence probability calculation result output by the reception pattern occurrence probability calculating means 46 is set as a prior probability (step B4 of FIG. 18). Calculating a product (step B5 of FIG. 18) of the prior probability and the primary process result, thereafter calculating a sum of the total (step B6 of FIG. 18) in a posterior probability calculation loop, and then normalizing it (step B7 of FIG. 18) make it possible to obtain the probability (posterior probability) that the object exists in respective reference positions. It is assumed that from the posterior probabilities calculated at respective reference positions, the reference position, of which the probability value becomes maximized, is a position estimation result of the object 1.

Next, an operation of the best mode for carrying out the second invention of the present invention will be explained in details by making a reference to FIG. 9 and FIG. 20.

Figure 20:
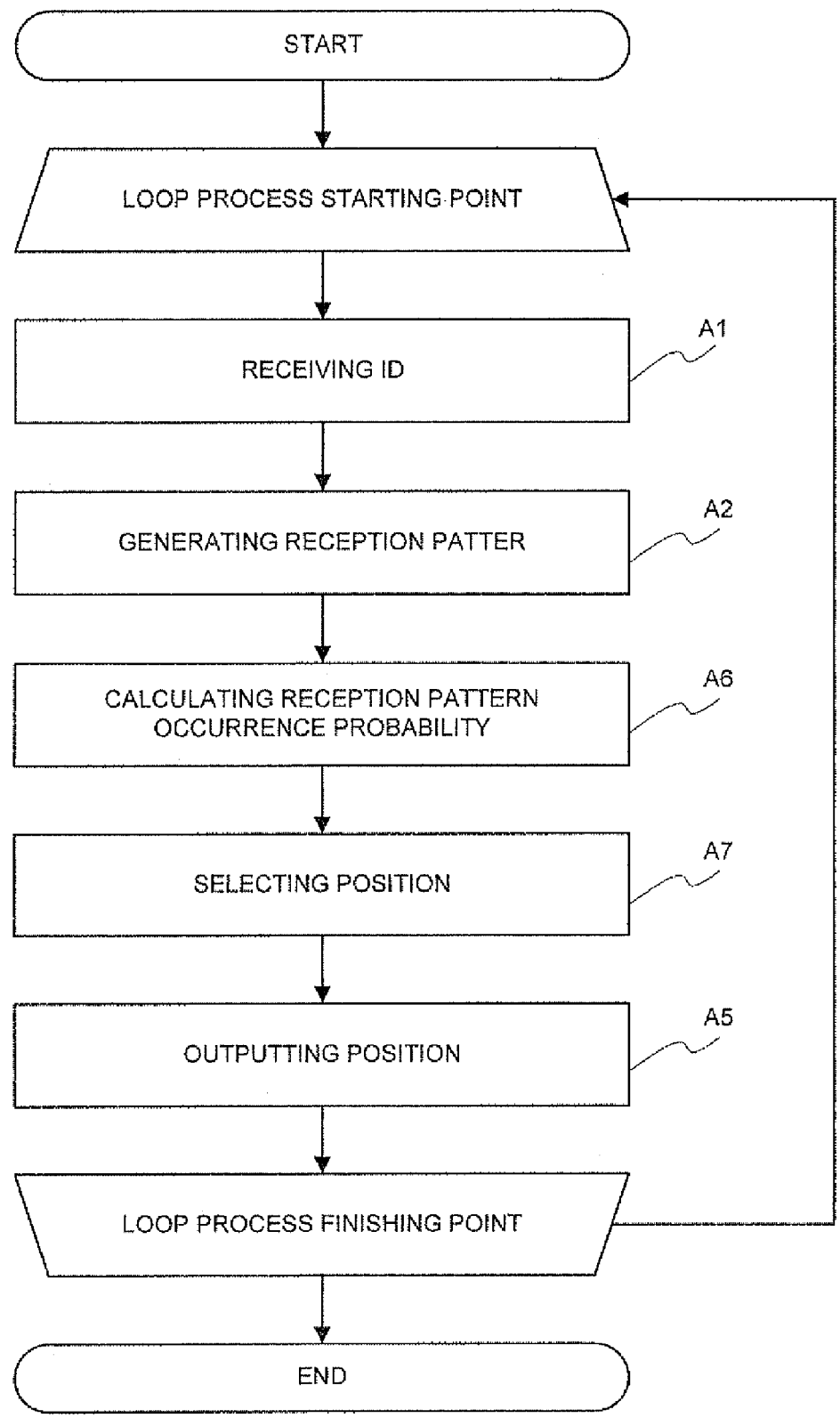
FIG. 20 is a flowchart illustrating an operation of the best mode for carrying out the second invention of the present invention.

Operations of the ID transmitting devices 2a, 2b, . . . , the ID receiving devices 3a, 3b, . . . , the reception pattern generating means 41, and the body position outputting device 5 in the best mode for carrying out the second invention of the present invention, which are shown in steps A1, A2, and A5 of FIG. 20, are identical to that of the ID transmitting devices 2a, 2b, . . . , the ID receiving devices 3a, 3b, . . . , the reception pattern generating means 41, and the body position outputting device 5 in the best mode for carrying out the first invention of the present invention, so its explanation is omitted.

The reception pattern occurrence probability calculating means 46 generates and outputs a reception pattern occurrence probability calculation result from the reception pattern generated by the reception pattern generating means 41 and the reference reception situation caused to correspond to each reference position stored in the reference reception situation storing unit 45 (step A6 of FIG. 20).

The body position selecting means 47 selects and decides a position of the object 1 from the reception pattern occurrence probability calculation result obtained by the reception pattern occurrence probability calculating means 46 (step A7 of FIG. 20).

Next, an effect of the best mode for carrying out the second invention of the present invention will be explained In the best mode for carrying out the present invention, a position of the object equipped with no extra device can be estimated by employing the ID transmitting device and the ID receiving device installed in the environment. Further, an influence by the multipath within the environment has been already reflected into the reception situation pre-acquired at a plurality of the reference positions. Calculating the reception pattern occurrence probability and estimating the position from such a reception situation enables the influence by the multipath within the environment to be offset. With this, the object does not need to be equipped with the extra device such as the ID transmitting device or the ID receiving device also under the multipath environment such as an indoor, and the position of the object can be estimated by utilizing only the radio communication apparatus installed in the environment.

By calculating the reception pattern occurrence probability from the reference reception situations such as the reception probability pattern and the reception feature quantity occurrence probability distribution pattern on the premise that the reception pattern fluctuates stochastically due to an influence by the protocol being used for radio communication, an influence by noise caused by the surrounding environment and the device itself, or the like, it is also possible to precisely estimate a position of the object by additionally performing the statistical filtering process with the reception pattern occurrence probability assumed to be a prior probability.

Additionally, in the foregoing embodiment, the reception pattern is generated from the reception feature quantity being obtained from all combinations of the ID transmitting devices and the ID receiving devices to estimate a position of the body; however so long as the range in which the body exists can be narrowed to a certain extent, a position of the body may be estimated with the reception pattern having as component only the reception feature quantity being obtained from a combination of the ID transmitting device and the ID receiving device existing in its range.

Next, the best mode for carrying out a third invention of the present invention will be explained in details by making a reference to the accompanied drawings.

Figure 21:
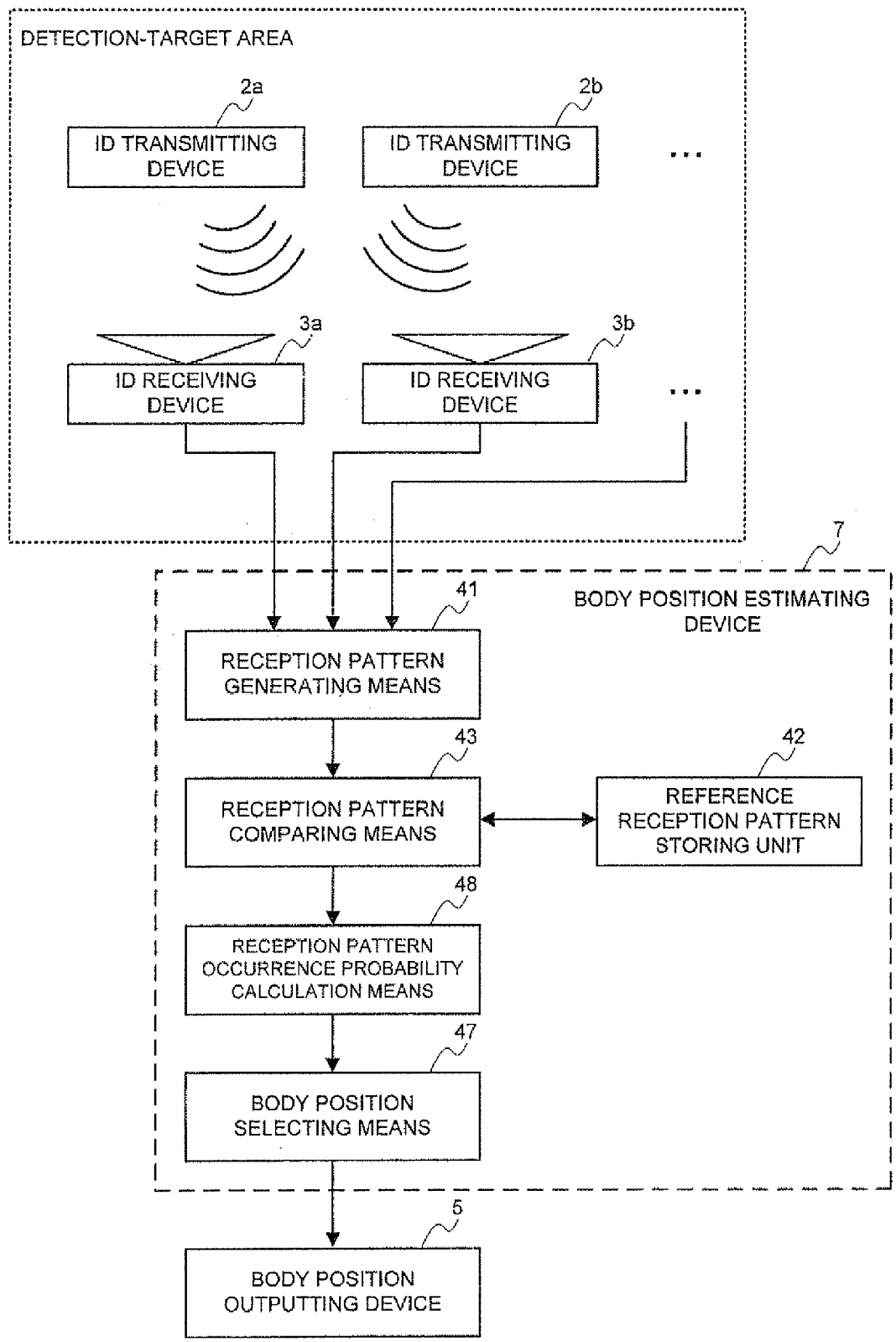
FIG. 21 is a block diagram illustrating a configuration of the best mode for carrying out a third invention of the present invention.

Upon making a reference to FIG. 21, the best mode for carrying out the third invention of the present invention differs from each of the best mode for carrying out the first invention of the present invention and the best mode for carrying out the second invention of the present invention in a point that a body position estimating device 7 includes a reception pattern occurrence probability calculating means 48, and a body position selecting means 47 in the best mode for carrying out the second invention of the present invention shown in FIG. 9 instead of the body position selecting means 44 in the configuration of the body position estimating device 4 in the best mode for carrying out the first invention of the present invention shown in FIG. 2 in addition to the configuration of the body position estimating device 4 in the best mode for carrying out the first invention of the present invention shown in FIG. 2.

The reception pattern occurrence probability calculating means 48 generates and outputs a reception pattern occurrence probability calculation result from the reception pattern comparison result output by the reception pattern comparing means 43 so that it has a property such that the smaller the inter-pattern distance, the bigger the probability value.

Figure 22:
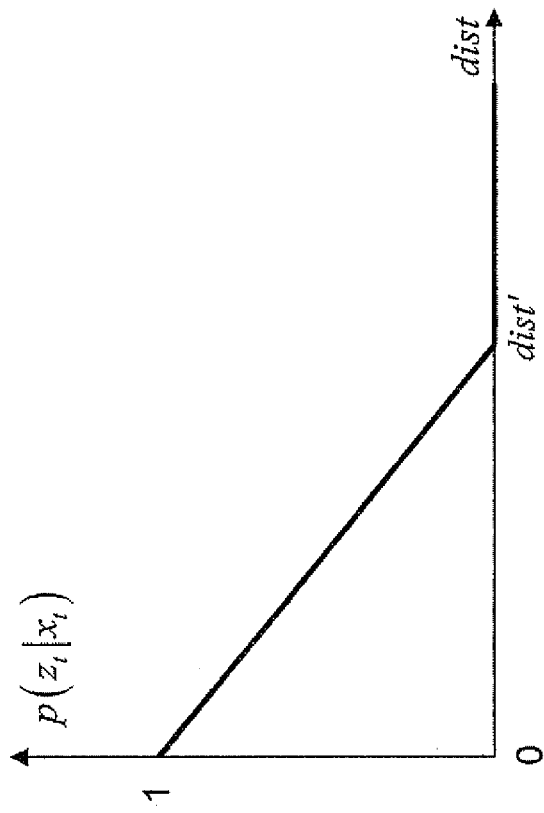
FIG. 22 is a view illustrating one example of a method of calculating a reception pattern occurrence probability from the reception pattern comparison result.

As a specific example of the reception pattern occurrence probability calculating means 48, there exists the technique of calculating a probability value with the calculation equation shown in FIG. 22 and generating and outputting a reception pattern occurrence probability calculation result. The inter-pattern distance constant shown in FIG. 22 is a constant such that the reception pattern occurrence probability is assumed to be 0 (zero) when the inter-pattern distance is larger than the inter-pattern distance constant. With such a calculation equation, the reception pattern occurrence probability can be calculated from the inter-pattern distance, and further, appropriately adjusting the inter-pattern distance constant enables the probability value of each of the candidate companions having a small inter-pattern distance to be easily compared with that of the other. For example, from a result of a preliminary experiment that is made in advance, it is possible to calculate an average value of the inter-pattern distances that fluctuate, and to set it as an inter-pattern distance constant.

Next, an operation of the best mode for carrying out the third invention of the present invention will be explained in details by making a reference to FIG. 21 and FIG. 23.

Figure 23:
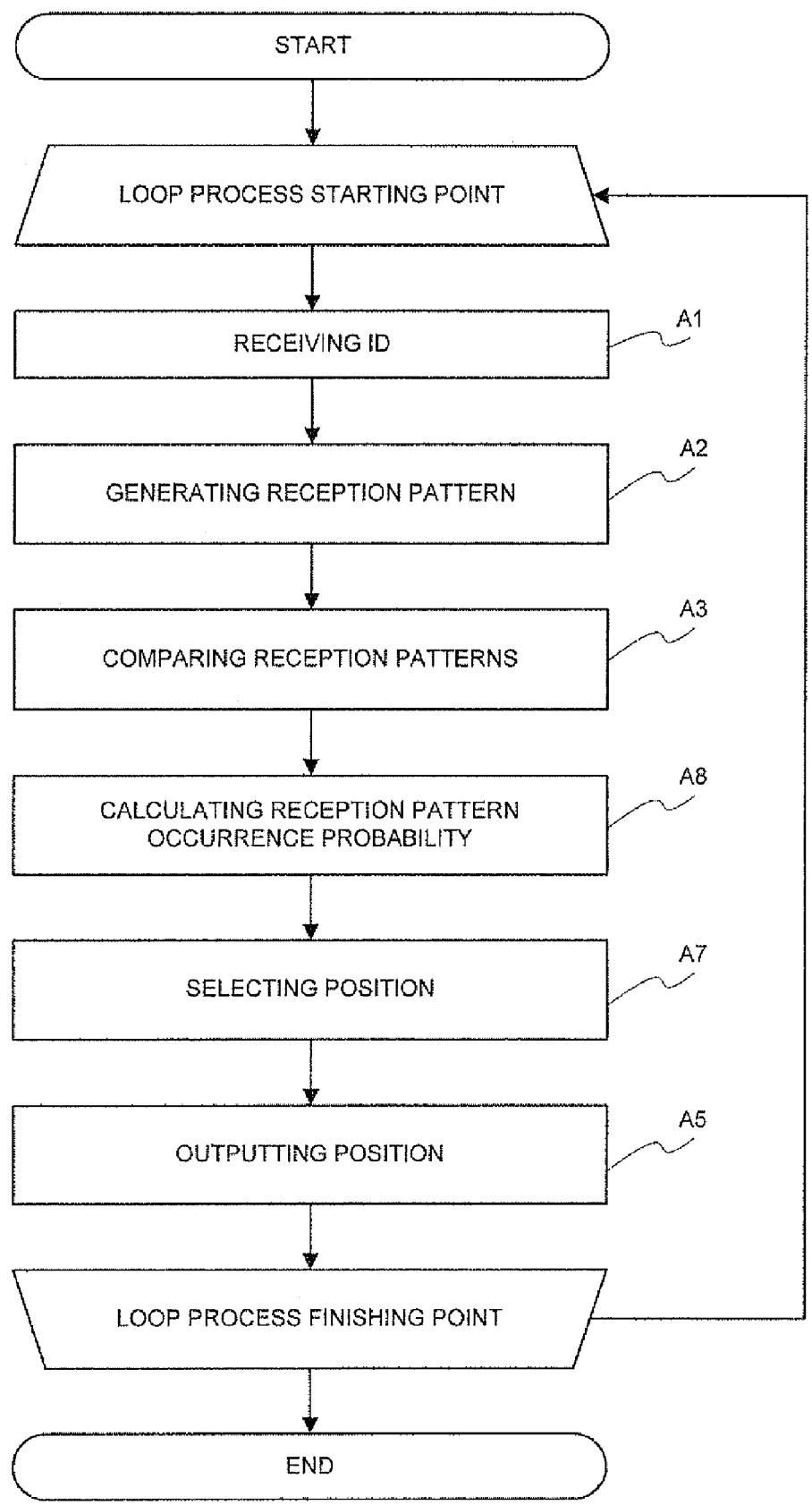
FIG. 23 is a flowchart illustrating an operation of the best mode for carrying out the third invention of the present invention.

Operations of the ID transmitting devices 2a, 2b, . . . , the ID receiving devices 3a, 3b, . . . , the reception pattern generating means 41, the reference reception pattern storing unit 42, and the reception pattern comparing means 43 in the best mode for carrying out the third invention of the present invention, which are shown in steps A1 to A3, and A5 of FIG. 23, are identical to that of the ID transmitting devices 2a, 2b, . . . , the ID receiving devices 3a, 3b, . . . , the reception pattern generating means 41, the reference reception pattern storing unit 42, and the reception pattern comparing means 43 in the best mode for carrying out the first invention of the present invention, respectively, and operations of the body position selecting means 47 and the body position outputting device 5 in the best mode for carrying out the third invention of the present invention, which are shown in a step A7 of FIG. 23, are identical to that of the body position selecting means 47 and the body position outputting device 5 in the best mode for carrying out the second invention of the present invention, respectively, so its explanation is omitted.

The reception pattern occurrence probability calculating means 48 generates and outputs a reception pattern occurrence probability calculation result from the reception pattern comparison result output by the reception pattern comparing means 43 (step A8 of FIG. 23).

Next, an effect of the best mode for carrying out the third invention of the present invention will be explained.

In the best mode for carrying out the present invention, in addition to the effect of the best mode for carrying out the first invention of the present invention, on the premise that the inter-pattern distance with the pre-acquired reference reception pattern fluctuates stochastically due to the fact that the reception pattern fluctuates stochastically due to an influence by the protocol being used for radio communication, an influence by noise caused by the surrounding environment and the device itself, or the like, calculating the reception pattern occurrence probability from the inter-pattern distance makes it possible also to precisely estimate a position of the object by additionally performing the statistical filtering process with the reception pattern occurrence probability assumed to be a prior probability even when an error occurs at the time of attempting to estimate a position of the object only with the inter-pattern distance.

Next, the best mode for carrying out a fourth invention of the present invention will be explained in details by making a reference to the accompanied drawings.

Figure 24:
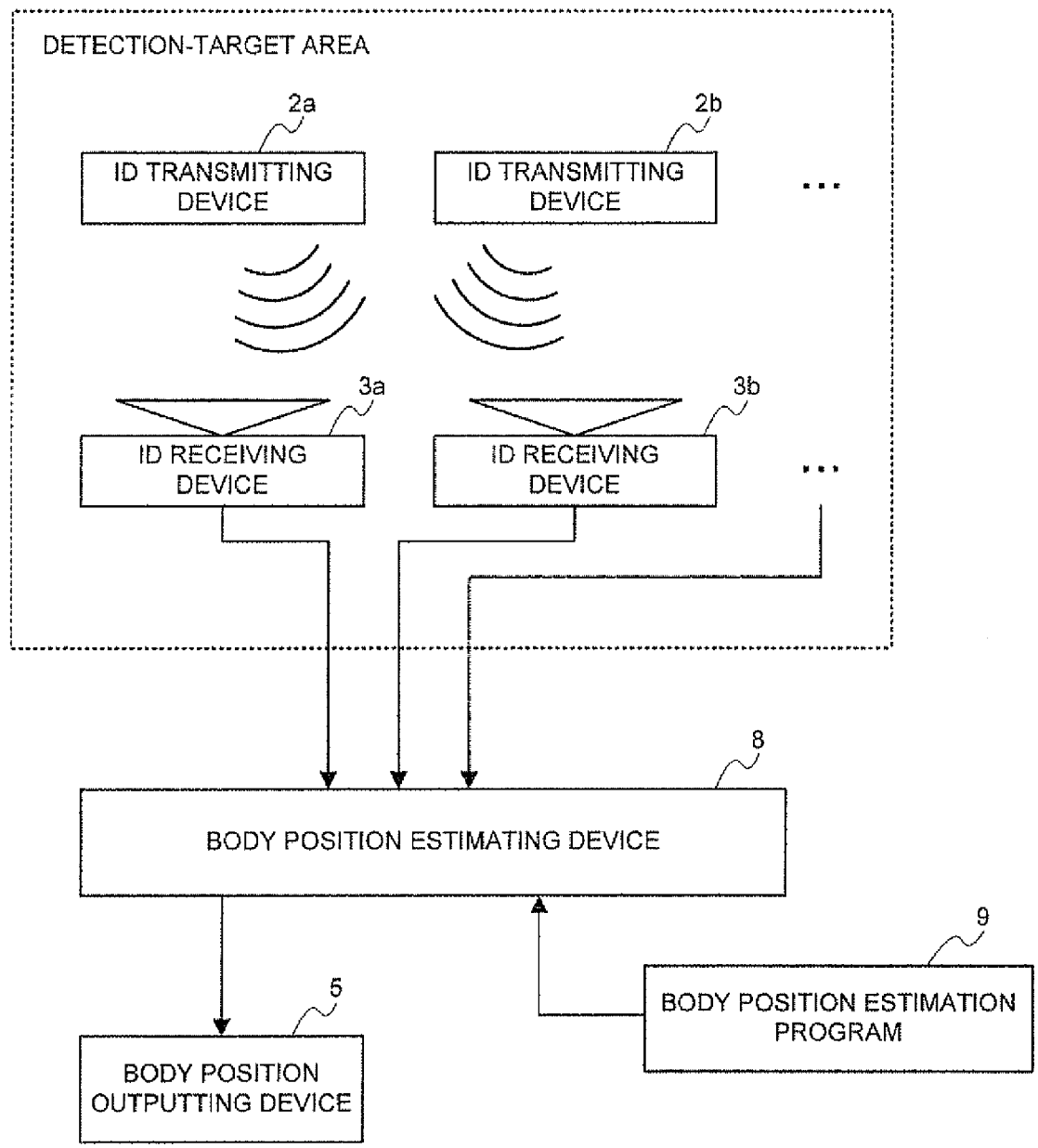
FIG. 24 is a block diagram illustrating a configuration of the best mode for carrying out a fourth invention of the present invention.

Upon making a reference to FIG. 24, the best mode for carrying out the fourth invention of the present invention includes the ID transmitting devices 2a, 2b, . . . , the ID receiving devices 3a, 3b, . . . , and the body position outputting device 5 similarly to the best mode for carrying out the first invention of the present invention, the best mode for carrying out the second invention of the present invention, and the best mode for carrying out the third invention of the present invention.

A body position estimation program 9 is loaded into the body position estimating device 8 and controls an operation of a body position estimating device 8. The body position estimating device 8, under control of the body position estimation program 9, executes a process identical to the process being performed by one of the body position estimating device 4 in the best mode for carrying out the first invention of the present invention, the body position estimating device 6 in the best mode for carrying out the second invention of the present invention, and the body position estimating device 7 in the best mode for carrying out the third invention of the present invention.

Additionally, by utilizing the present invention, it is also possible to detect a passage of a person or an article having no RFID for issuing a warning hereto, and to detect a passage of a person or an article having passed through the side of a gate for issuing a warning hereto. Further, as a method of utilizing the present invention, the method of, by pre-monitoring a person or an article that is likely to pass through the outside of the gate, and finishing identification or authentication of the ID in advance, providing a service the moment it passes, or the like is also thinkable. In addition hereto, utilizing the present invention makes it possible also to simultaneously realize monitoring of a person or an article around the gate and detecting of a person or an article passing through the gate with one reader or a small number of the readers.

An Exemplary Example 1

Next, a first exemplary example of the present invention will be explained by making a reference to the accompanied drawings. Such an exemplary example corresponds to the best mode for carrying out the first invention of the present invention.

This exemplary example includes an active type RFID tag that employs a button cell as a power source to transmit an inherent ID, which it has, for each constant time (for example, 0.5 sec.) with radio communication as the ID transmitting devices 2a and 2b each transmitting the ID, and an RFID reader that receives the IDs from the ID transmitting devices 2a and 2b and is capable of measuring the received signal strength indication (256-stage integral values ranging 0 to 255) as the ID receiving devices 3a and 3b each receiving the ID. The body position estimating device 4 is realized with a personal computer, and a display is employed as the body position outputting device 5. The personal computer includes a central processing unit that functions as the reception pattern generating means 41, the reception pattern comparing means 43, and the body position selecting means 44, and a storage device that function as the reference reception pattern storing unit 42.

Figure 25:
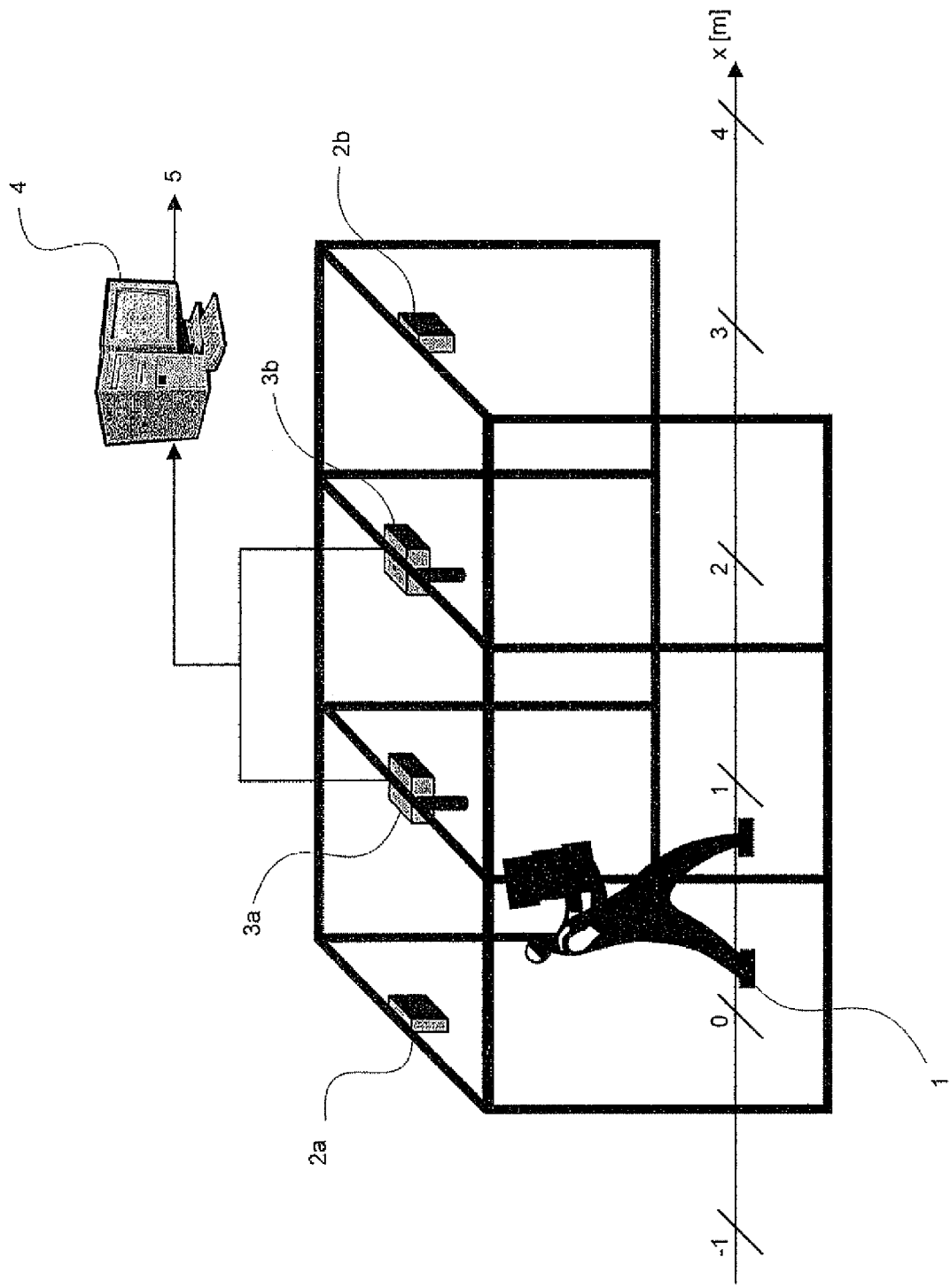
FIG. 25 is a view illustrating a summary of a first exemplary example of the present invention.

Upon making a reference to FIG. 25, the ID transmitting devices 2a and 2b, and the ID receiving devices 3a and 3b in this exemplary example are installed inside a tunnel, and the body position estimating device 4 estimates a position on an X-axis of the object 1 that exists in and around the tunnel. Further, the tunnel is shielded with a radio wave reflector in order to suppress an influence by a fluctuation in the environment outside the tunnel from extending in the tunnel.

The reception pattern generating means 41 generates a reception pattern from the IDs of the ID transmitting devices 2a and 2b received by the ID receiving devices 3a and 3b, and the measured received signal strength indication. Herein, with the case that the two ID receiving devices 3a and 3b receive the IDs of the two ID transmitting devices 2a and 2b, the reception pattern becomes a pattern having a four-dimension feature vector.

The reception pattern corresponding to each of a plurality of the reference positions pre-stored in the reference reception pattern storing unit 42 is prepared based upon a result of an experiment (hereinafter, referred to as a calibration) that is made in advance. In the calibration, the object or the body similar hereto (hereinafter, referred to as a reference body) is arranged at each point obtained by appropriately partitioning a target area to acquire the IDs of the ID transmitting devices 2a and 2b and the reception intensities with the ID receiving devices 3a and 3b. The reference body that is used in the calibration does not need to be completely equalized with the object for estimating a position, and the body of which the material and size are akin hereto can be employed. For example, with the case that a person is an object for estimating a position, the reference reception pattern acquired by calibrating a certain person as a reference body also can be utilized for estimating a position of a person other than the person assumed to be a reference body.

Figure 26:
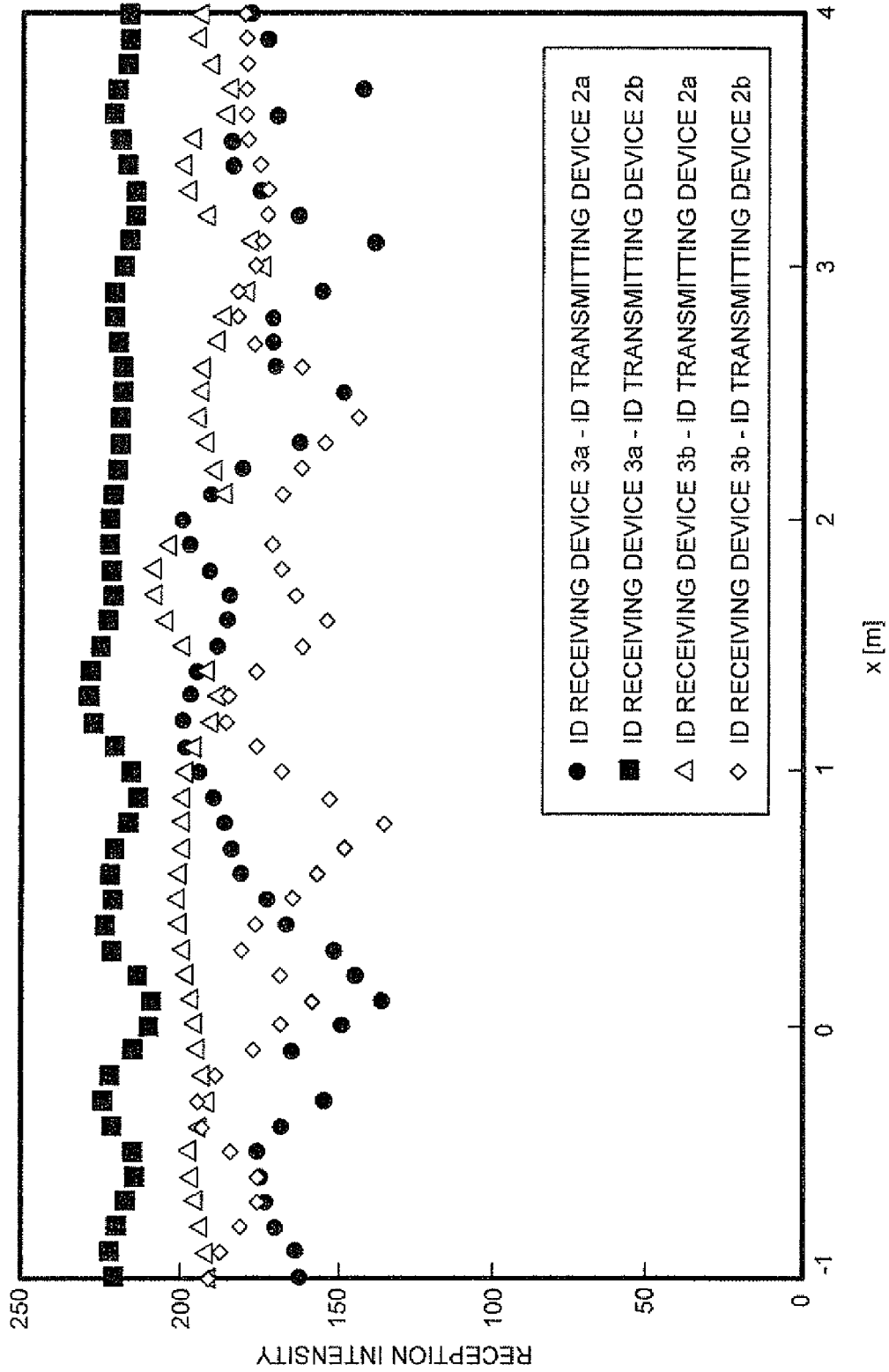
FIG. 26 is a graph illustrating one example of a relation between the actually measured reference position and reception pattern in the first exemplary example of the present invention.

A result of the calibration of arranging a person as a reference body at each point obtained by partitioning the x axis for each 10-cm interval to acquire the reception intensities of the ID transmitting devices 2a and the ID transmitting device 2b with the ID receiving device 3a and the ID receiving device 3b, which is exemplified in FIG. 25, is shown in FIG. 26. Upon making a reference to FIG. 26, it can be seen that the reception pattern fluctuates depending upon the position of the person, being a reference body. The reception patterns at 51 points in all obtained by partitioning the section ranging −1 m to 4 m on the X axis for each 10-cm interval are generated based upon the result of the calibration shown in FIG. 26, are combined with respective reference positions, which the reference reception pattern storing unit 42 is caused to store.

The reception pattern comparing means 43 calculates an inter-pattern distance between the reception pattern generated by the reception pattern generating means 41 and the reception pattern that corresponds to each of a plurality of the reference positions pre-stored in the reference reception pattern storing unit 42. In this exemplary example, the Euclid distance of the feature vector being generated from the reception pattern is calculated as an inter-pattern distance.

Figure 27:
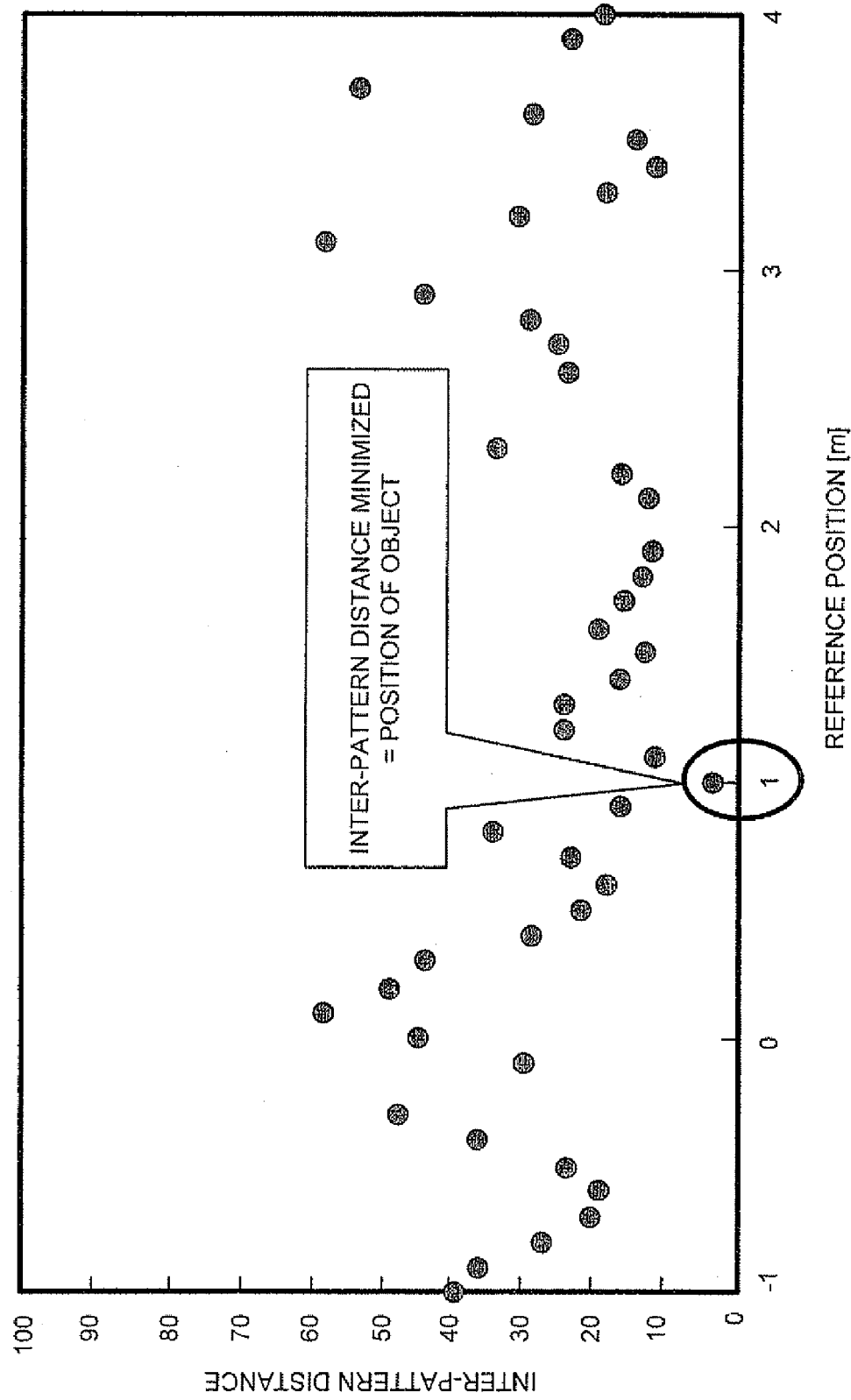
FIG. 27 is a graph illustrating one example of a reception pattern comparison result in the first exemplary example of the present invention.

The Euclid distance calculated by comparing the reception pattern acquired when the person, being an object for estimating a position, actually exists at a spot of 1 m on the X axis with each of 51 reception patterns that have been pre-stored correspondingly to respective reference positions in the reference reception pattern storing unit 42 is shown in FIG. 27. A reception pattern comparison result can be generated from the comparison result as shown in FIG. 27, and the generated reception pattern comparison result is output to the body position selecting means 44.

The body position selecting means 44 selects the reference position such that the inter-pattern distance is minimized from the reception pattern comparison result output by the reception pattern comparing means 43, and outputs it as a position estimation result of the object. Upon making a reference to FIG. 27, it can be seen that the inter-pattern distance with the reception pattern that corresponds to the reference position having a value of 1 m is minimized, and the position of the object has been correctly estimated.

The position of the object obtained by the body position selecting means 44 is output with the display, being the body position outputting device 5.

In this exemplary example, the position of the person that exists in and around the tunnel can be estimated by employing the ID transmitting device and the ID receiving device installed in the tunnel shielded with the radio wave reflector. With this, it is possible to estimate a position of the object by employing the radio communication without equipping the object with an extra device even under the multipath environment such as the tunnel shielded with the radio wave reflector.

Above, in this exemplary example, the case of numerizing a difference between the reception pattern and the reference reception pattern with the Euclid distance as a technique of the reception pattern comparing means was explained; however a difference between the reception pattern and the reference reception pattern also can be numerized with the city-block distance.

Further, in this exemplary example, the case of selecting the reference position such that the inter-pattern distance became minimized from the reception pattern comparison result as a technique of the body position selecting means was explained; however it is also possible to select a position of the object by, upon calculating the reception pattern occurrence probability calculation result from the inter-pattern distance of the reception pattern comparison result with the method as shown in FIG. 22, employing the statistical technique as explained by employing FIG. 17 and FIG. 18.

An Exemplary Example 2

Next, a second exemplary example of the present invention will be explained by making a reference to the accompanied drawings. Such an exemplary example corresponds to the best mode for carrying out the second invention of the present invention.

A configuration of this exemplary example, as compared with the configuration in the first exemplary example, differs in a point that the storage device of the personal computer functions as the reference reception situation storing unit 45, the central processing unit of the personal computer function as the reception pattern generating means 41, the reception pattern occurrence probability calculating means 46, and the body position selecting means 47. Further, in this exemplary example, the personal computer is installed in the tunnel shown in FIG. 25, and operates similarly to the case of the first exemplary example of the present invention.

The reception situations corresponding to a plurality of the reference positions, which the reference reception situation storing unit 45 is caused to pre-store, are prepared based upon the result of the calibration. In the calibration, the reference body is arranged at each point obtained by appropriately partitioning the target area, and the reception probability pattern is prepared from the calculation result of the probability that the ID receiving devices 3a and 3b can receive the IDs of the ID transmitting devices 2a and 2b, and is combined with each reference position, which the reference reception situation storing unit 42 is caused to store. The reception probability can be calculated, for example, by setting a measurement time such that the number of times of the ID origination of the to-be-targeted ID transmitting device is 1,000 (setting the measurement time to 500 sec. when the origination time period of the ID is 0.5 sec.), measuring the number of times by which the ID receiving device was able to receive the IDs during the measurement time, and obtaining a ratio of the measured number of times of the reception over the number of times of the originations. The reference body that is used in the calibration does not need to be completely equalized with the object for estimating a position, and the body of which the material and size are akin hereto can be employed. For example, with the case that a person is an object for estimating a position, the reference reception situation acquired by calibrating a certain person as a reference body also can be utilized for estimating a position of a person other than the person assumed to be a reference body.

The reception pattern occurrence probability calculating means 46 calculates and outputs a reception pattern occurrence probability from the reception pattern generated by the reception pattern generating means 41, and the reception probability pattern that correspond to each of a plurality of the reference positions pre-stored in the reference reception situation storing unit 45 with the method shown in FIG. 15.

The body position selecting means 47 selects the reference position such that the reception pattern occurrence probability becomes maximized from the reception pattern occurrence probability calculation result output by the reception pattern occurrence probability calculating means 46, and outputs it as a position estimation result of the object.

Above, in this exemplary example, the case of measuring the probability that the ID was able to be received in the calibration was explained; however the probability that the ID can be received can be calculated based upon the protocol that is used in the radio communication between each of the ID receiving devices 3a and 3b, and each of the ID transmitting devices 2a and 2b. In this exemplary example, when the active type RFID tag that is used as each of the ID transmitting devices 2a and 2b uses the protocol called an ALOHA technique as a communication technique, each ID transmitting device transmits the ID, which it has, at a random timing. At this moment, in a case where signals transmitted from a plurality of tags simultaneously become incident (hereinafter, referred to as a signal collision) upon a reception antenna with which the ID receiving device is equipped, it becomes impossible to read off the ID from these signals. That is, the fact that the ID cannot be received can be interpreted as an occurrence of the signal collision. At this time, the method of calculating the probability that no signal collision occurs, that is, the reception probability based upon the protocol is shown in FIG. 28. As shown in FIG. 28, the reception probability can be calculated from the number of times of the ID origination per a unit time, the communication time required for a one-time ID origination, and a total number of the tags that can receive the ID. Calculating the reception probability based upon the protocol makes it possible to eliminate the calibration, or to reduce the time and labor required for the calibration.

Further, in this exemplary example, the case of selecting the reference position such that the reception pattern occurrence probability became maximized from the reception pattern occurrence probability calculation result was explained as a technique of the body position selecting means; however the position of the object can be selected by employing the statistical technique as explained by employing FIG. 17 and FIG. 18.

Further, in this exemplary example, the case that the reference reception situation storing unit 45 stored the reception probability pattern as a reception situation, and the reception pattern occurrence probability calculating means 46 calculated the reception pattern occurrence probability with the method shown in FIG. 15 was explained; however it is also possible that the reference reception situation storing unit 45 stores the reception feature quantity occurrence probability distribution pattern as a reception situation, and the reception pattern occurrence probability calculating means 46 calculates the reception pattern occurrence probability with the method shown in FIG. 16. Herein, the reception situations corresponding to a plurality of the reference positions that the reference reception situation storing unit 45 is caused to pre-store are prepared based upon the result of the calibration. In the calibration, the reference body is arranged at each point obtained by appropriately partitioning the target area, and the reception feature quantity occurrence probability distribution pattern is generated from the reception feature quantity that is obtained at the moment of receiving the IDs of the ID transmitting devices 2a and 2b with the ID receiving devices 3a and 3b, and is combined with each reference position, which the reference reception situation storing unit 42 is caused to store. The reception feature quantity occurrence probability distribution can be prepared, for example, by setting the measurement time such that the number of times of the ID origination of the to-be-targeted ID transmitting device is 1,000 (setting the measurement time to 500 sec. when the origination time period of the ID is 0.5 sec.), generating from the value of the reception feature quantity being acquired during the measurement time the distribution of the number of times by which respective values are acquired, obtaining a ratio of respective number of times over the number of times of the originations, and assuming it to be a provability distribution. The reference body that is used in the calibration does not need to be completely equalized with the object for estimating a position, and the body of which the material and size are akin hereto can be employed. For example, with the case that a person is an object for estimating a position, the reference reception situation acquired by calibrating a certain person as a reference body also can be utilized for estimating a position of a person other than the person assumed to be a reference body.

Above, in the first and second exemplary examples of the present invention, the case of employing the active type RFID capable of measure an electric field intensity together with the ID as an ID receiving device was explained; another radio communication appliance for measuring the electric field intensity, the communication quality, or the arrival time together with the ID can be employed. In this case, employing the value of the electric field intensity, the communication quality, or the arrival time, which are measurable, as a reception feature quantity makes it possible to perform a process similar to the process of the first and second exemplary examples of the present invention.

Further, in the first and second exemplary examples of the present invention, the case of estimating a position of the object as a one-dimension coordinate on the x axis was explained; however, partitioning the target area two-dimensionally or three-dimensionally, thereby to acquire the reference reception patterns in the calibration makes it possible also to estimate a position of the object as a two-dimension coordinate in a plane, or as a three-dimension coordinate in a space.

Further, in the first and second exemplary examples of the present invention, the case of shielding the tunnel with the radio wave reflector in order to suppress an influence by a fluctuation in the environment outside the tunnel from extending in the tunnel was explained; however the radio wave reflector can be removed.

The present invention is applicable to the application such as the program for causing the computer to execute acquirement of the position or existence of a person or an article utilizing the radio communication system.

The invention claimed is:

1. A position estimating system for estimating an existence position of an object, characterized in comprising:
    at least one transmitting device or more that is installed at pre-decided positions within a detection-target area, and transmits identification information for identifying a device with radio communication;
    at least one receiving device or more that is installed at pre-decided positions within said detection-target area, receives said identification information transmitted from said transmitting device, and measures a reception intensity thereof; and
    a position estimating means for estimating an existence position of the object within the target area based upon a reception pattern that is comprised of the reception intensities that are obtained from at least one combination or more, out of combinations of said transmitting devices and said receiving devices,
    wherein the object is not equipped with the transmitting device and the receiving device.

2. The position estimating system according to claim 1, characterized in that said position estimating means comprises:
    a reference pattern database in which an existence position of the object within the target area and a reference reception pattern, being a reception pattern that is obtained when the object exists in this existence position, have been stored correspondingly; and
    a means for retrieving the existence position corresponding to the reference reception pattern that most approximates said reception patter from said reference pattern database, and estimating an existence position of the object from the retrieved existence position.

3. The position estimating system according to claim 1, characterized in that said position estimating means comprises:
    a reference pattern database in which an existence position of the object within the target area and a reception probability pattern have been stored correspondingly, said reception probability pattern being configured of probabilities by the combinations of said transmitting devices and said receiving devices that the identification information transmitted from said transmitting device can be received by said receiving device in the case that the object exists in this existence position;
    a means for calculating a reception pattern occurrence probability, being an occurrence probability of the reception pattern, from said reception pattern and said reception probability pattern; and
    an object position estimating means for estimating an existence position of the object from the calculated reception pattern occurrence probability.

4. The position estimating system according to claim 1, characterized in that said position estimating means comprises:
    a reference pattern database in which an existence position of the object within the target area and a reception intensity occurrence probability distribution pattern have been stored correspondingly, said reception intensity occurrence probability distribution pattern being configured of occurrence probability distributions of the reception intensities by the combinations of said transmitting devices and said receiving devices in the case that the object exists in this existence position,
    a means for calculating a reception pattern occurrence probability, being an occurrence probability of the reception pattern, from said reception pattern and said reception intensity occurrence probability distribution pattern; and
    an object position estimating means for estimating an existence position of the object from the calculated reception pattern occurrence probability.

5. The position estimating system according to claim 1, characterized in that said position estimating means comprises:
    a reference pattern database in which an existence position of the object within the target area and a reference reception pattern, being a reception pattern that is obtained when the object exists in this existence position, have been stored correspondingly; and
    a means for calculating a reception pattern occurrence probability, being an occurrence probability of the reception pattern, from an inter-reception-pattern distance that is obtained by comparing said reception pattern and said reference reception pattern; and
    an object position estimating means for estimating an existence position of the object from the calculated reception pattern occurrence probability.

6. The position estimating system according to one of claim 3 to claim 5, characterized in that said object position estimating means retrieves the existence position corresponding to the pattern having a largest reception pattern occurrence probability, out of the reception probability pattern, the reception intensity occurrence probability distribution pattern or the reference reception pattern, from said reference pattern database, and estimates the retrieved existence position to be an existence position of the object within the target area.

7. The position estimating system according to one of claim 3 to claim 5, characterized in that said object position estimating means estimates an existence position of the object from said reception pattern occurrence probability with a filtering employing a probability inference.

8. The position estimating system according to claim 1, characterized in that said position estimating means estimates an existence position of the object within the target area based upon a reception pattern that is comprised of the reception intensities that are obtained from two combinations or more, out of combinations of said transmitting devices and said receiving devices.

9. A position estimating method of estimating an existence position of an object, characterized in estimating an existence position of the object within the target area based upon a reception pattern that is comprised of reception intensities that are obtained from at least one combination or more, out of combinations of at least one transmitting device or more that is installed at pre-decided positions within a detection-target area, and transmits identification information for identifying a device with radio communication, and at least one receiving device or more that is installed at pre-decided positions within said detection-target area, receives said identification information transmitted from said transmitting device, and measures a reception intensity thereof, wherein the object is not equipped with the transmitting device and the receiving device.

10. The position estimating method according to claim 9, characterized in:
retrieving the existence position corresponding to the reference reception pattern that most approximates said reception patter from a reference pattern database in which an existence position of the object within the target area and a reference reception pattern, being a reception pattern that is obtained when the object exists in this existence position, have been stored correspondingly and
estimating an existence position of the object from the retrieved existence position.

11. The position estimating method according to claim 9, characterized in:
calculating a reception pattern occurrence probability, being an occurrence probability of the reception pattern, from said reception pattern and a reception probability pattern, said reception probability pattern being configured of probabilities by the combinations of said transmitting devices and said receiving devices that the identification information transmitted from said transmitting device can be received by said receiving device in the case that the object exists in this existence position; and
estimating an existence position of the object from the calculated reception pattern occurrence probability.

12. The position estimating method according to claim 9, characterized in:
calculating a reception pattern occurrence probability, being an occurrence probability of the reception pattern, from said reception pattern and a reception intensity occurrence probability distribution pattern, said reception intensity occurrence probability distribution pattern being configured of occurrence probability distributions of the reception intensities by the combinations of said transmitting devices and said receiving devices in the case that the object exists in this existence position; and
estimating an existence position of the object from the calculated reception pattern occurrence probability.

13. The position estimating method according to claim 9, characterized in:
calculating a reception pattern occurrence probability, being an occurrence probability of the reception pattern, from an inter-reception-pattern distance that is obtained by comparing said reception pattern and a reference reception pattern, said reference reception pattern being a reception pattern that is obtained when the object exists in this existence position; and
estimating an existence position of the object from the calculated reception pattern occurrence probability.

14. The position estimating method according to one of claim 9 to claim 11, characterized in:
retrieving the existence position corresponding to the pattern having a largest reception pattern occurrence probability, out of the reception probability pattern, the reception intensity occurrence probability distribution pattern or the reference reception pattern; and
estimating the retrieved existence position to be an existence position of the object within the target area.

15. The position estimating method according to one of claim 11 to claim 13, characterized in estimating an existence position of the object from said reception pattern occurrence probability with a filtering employing a probability inference.

16. The position estimating method according to claim 9, characterized in estimating existence position of the object within the target area based upon a reception pattern that is comprised of the reception intensities that are obtained from two combinations or more, out of combinations of said transmitting devices and said receiving devices.

17. A program for estimating an existence position of an object, characterized in causing an information processing unit to execute the position estimating process of estimating an existence position of the object within the target area based upon a reception pattern that is comprised of reception intensities that are obtained from at least one combination or more, out of combinations of at least one transmitting device or more that is installed at pre-decided positions within a detection-target area, and transmits identification information for identifying a device with radio communication, and at least one receiving device or more that is installed at pre-decided positions within said detection-target area, receives said identification information transmitted from said transmitting device, and measures a reception intensity thereof, wherein the object is not equipped with the transmitting device and the receiving device.

18. The program according to claim 17, characterized in that said position estimating process comprises of:
retrieving the existence position corresponding to the reference reception pattern that most approximates said reception pattern from a reference pattern database, said reference pattern database in which an existence position of the object within the target area and a reference reception pattern, being a reception pattern that is obtained when the object exists in this existence position, have been stored correspondingly; and
estimating an existence position of the object from the retrieved existence position.

19. The program according to claim 17, characterized in that said position estimating process comprises of:
calculating a reception pattern occurrence probability, being an occurrence probability of the reception pattern, from said reception pattern and a reception probability pattern, said reception probability pattern being configured of probabilities by the combinations of said transmitting devices and said receiving devices that the identification information transmitted from said transmitting device can be received by said receiving device in the case that the object exists in this existence position; and
estimating an existence position of the object from the calculated reception pattern occurrence probability.

20. The program according to claim 17, characterized in that said position estimating process comprises of:
calculating a reception pattern occurrence probability, being an occurrence probability of the reception pattern, from said reception pattern and a reception intensity occurrence probability distribution pattern, said reception intensity occurrence probability distribution pattern being configured of occurrence probability distributions of the reception intensities by the combinations of said transmitting devices and said receiving devices in the case that the object exists in this existence position; and
estimating an existence position of the object from the calculated reception pattern occurrence probability.

21. The program according to claim 17, characterized in that said position estimating process comprises of:

calculating a reception pattern occurrence probability, being an occurrence probability of the reception pattern, from an inter-reception-pattern distance that is obtained by comparing said reception pattern and a reference reception pattern, said reference reception pattern being a reception pattern that is obtained when the object exists in this existence position; and estimating an existence position of the object from the calculated reception pattern occurrence probability.

22. The program according to one of claim 19 to claim 21, characterized in that said estimating process an existence position of the object comprises of:

retrieving the existence position corresponding to the pattern having a largest reception pattern occurrence probability, out of the reception probability pattern, the reception intensity occurrence probability distribution pattern or the reference reception pattern; and estimating the retrieved existence position to be an existence position of the object within the target area.

23. The program according to one of claim 19 to claim 21, characterized in that said estimating process an existence position of the object estimates an existence position of the object from said reception pattern occurrence probability with a filtering employing a probability inference.

24. The program according to claim 17, characterized in that said position estimating process estimates existence position of the object within the target area based upon a reception pattern that is comprised of the reception intensities that are obtained from two combinations or more, out of combinations of said transmitting devices and said receiving devices.

* * * * *